(12) United States Patent
Lee

(10) Patent No.: US 11,868,624 B2
(45) Date of Patent: Jan. 9, 2024

(54) COMPUTING SYSTEM AND OPERATING METHOD THEREOF

(71) Applicant: SK hynix Inc., Gyeonggi-do (KR)

(72) Inventor: Gun Wook Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/900,936

(22) Filed: Sep. 1, 2022

(65) Prior Publication Data

US 2022/0413718 A1 Dec. 29, 2022

Related U.S. Application Data

(63) Continuation of application No. 17/157,316, filed on Jan. 25, 2021, now Pat. No. 11,461,021, which is a continuation-in-part of application No. 16/943,597, filed on Jul. 30, 2020, now Pat. No. 11,455,102, and a continuation-in-part of application No. 16/943,653, filed on Jul. 30, 2020.

(30) Foreign Application Priority Data

Mar. 9, 2020 (KR) .................. 10-2020-0029238
Mar. 9, 2020 (KR) .................. 10-2020-0029240

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)
(58) Field of Classification Search
CPC ..... G06F 3/0622; G06F 3/0655; G06F 3/0679
USPC ....................................... 711/154
See application file for complete search history.

(56) References Cited

U.S. PATENT DOCUMENTS

| | | | |
|---|---|---|---|
| 8,341,417 B1 | 12/2012 | McGrew | |
| 9,258,111 B2 * | 2/2016 | Lee | H04L 9/0897 |
| 2003/0187799 A1 * | 10/2003 | Sellars | H04N 21/4627 |
| | | | 705/51 |
| 2011/0167269 A1 | 7/2011 | Baykal et al. | |
| 2011/0246707 A1 | 10/2011 | Ito | |
| 2015/0046634 A1 | 2/2015 | Maeda et al. | |
| 2015/0089218 A1 * | 3/2015 | Overby | G06F 21/78 |
| | | | 713/161 |
| 2015/0350206 A1 * | 12/2015 | Shin | H04L 63/0876 |
| | | | 713/170 |
| 2019/0052632 A1 * | 2/2019 | Takagi | H04L 9/0825 |

(Continued)

FOREIGN PATENT DOCUMENTS

CN 110096908 A 8/2019

OTHER PUBLICATIONS

Office Action for the U.S. Appl. No. 16/943,653 issued by the USPTO dated Mar. 17, 2023.

(Continued)

*Primary Examiner* — Christopher B Shin
(74) *Attorney, Agent, or Firm* — IP & T GROUP LLP

(57) ABSTRACT

An electronic device is provided. A computing system includes a storage device and a host. The storage device includes a memory device including a write protection area. The host performs an operation of providing, to the storage device, a first request regarding security write and write data in parallel with an operation of generating a host authentication code based on the write data and a key shared with the storage device.

18 Claims, 25 Drawing Sheets

(56) References Cited

U.S. PATENT DOCUMENTS

2019/0102568 A1    4/2019    Hausauer et al.
2019/0303304 A1    10/2019    Lee et al.
2020/0201783 A1*    6/2020    Lee .................... G06F 12/1441
2020/0244458 A1    7/2020    Kanbe
2020/0328879 A1    10/2020    Makaram et al.
2021/0216616 A1*    7/2021    Lee .................... G06F 12/1483

OTHER PUBLICATIONS

Office Action on the U.S. Appl. No. 16/943,653 issued by the USPTO dated Sep. 27, 2023.
Office Action for the Chinese Patent Application No. 202010893314.4 issued by the Chinese Patent Office dated Sep. 25, 2023.

\* cited by examiner

| Nonce | Address | Block Count |

FIG. 14A

Authentication Read Request

| Field Name | Value |
|---|---|
| Stuff Bytes | 0...00h |
| MAC / Key | 0...00h |
| Data | 0...00h |
| Nonce | Nonce from the host |
| Write Counter | 0...00h |
| Address | Address |
| Block Count | # of 256Bytes Blocks |
| Result | 0000h |
| Req./Resp. | 0004h |

FIG. 14B

Authentication Read Response

| Field Name | Value |
|---|---|
| Stuff Bytes | 0...00h |
| MAC / Key | MAC from the device |
| Data | Data |
| Nonce | Copy of the Nonce |
| Write Counter | 0...00h |
| Address | Address |
| Block Count | # of 256Bytes Blocks |
| Result | Result Code |
| Req./Resp. | 0300h |

FIG. 16A

RPMB Message of Authentication Write Request

| Field Name | Value |
|---|---|
| Stuff Bytes | 0...00h |
| MAC / Key | MAC from the host |
| Data | Data |
| Nonce | 0...00h |
| Write Counter | Current Counter Value |
| Address | Address |
| Block Count | # of 256Bytes Blocks |
| Result | 0000h |
| Req./Resp. | 0003h |

FIG. 16B

RPMB Message of Result Read Request

| Field Name | Value |
|---|---|
| Stuff Bytes | 0...00h |
| MAC / Key | 0...00h |
| Data | 0...00h |
| Nonce | 0...00h |
| Write Counter | 0...00h |
| Address | 0000h |
| Block Count | 0000h |
| Result | 0000h |
| Req./Resp. | 0005h |

FIG. 16C

RPMB Message of Result Read Response

| Field Name | Value |
|---|---|
| Stuff Bytes | 0...00h |
| MAC / Key | MAC from the device |
| Data | 0...00h |
| Nonce | 0...00h |
| Write Counter | New Counter Value |
| Address | Address |
| Block Count | 0000h |
| Result | Result Code |
| Req./Resp. | 0300h |

COMPUTING SYSTEM AND OPERATING METHOD THEREOF

CROSS-REFERENCE TO RELATED APPLICATIONS

This application is a continuation of U.S. patent application Ser. No. 17/157,316 filed on Jan. 25, 2021. The '316 application is a continuation-in-part of U.S. patent application Ser. No. 16/943,653 filed on Jul. 30, 2020 which claims benefits of priority of Korean Patent Application No. 10-2020-0029238, filed on Mar. 9, 2020, and a continuation-in-part of U.S. patent application Ser. No. 16/943,597 filed on Jul. 30, 2020 which claims benefits of priority of Korean Patent Application Nos. 10-2020-0029238 and 10-2020-0029240, filed on Mar. 9, 2020, and filed on Mar. 9, 2020. The entire disclosure of each of the foregoing applications is incorporated herein by reference in its entirety.

BACKGROUND

Field of Invention

Various embodiments of the present disclosure relate generally to an electronic device, and more particularly, to a computing system and an operating method thereof.

Description of Related Art

A storage device may store data in response to control of a host device such as a computer or a smartphone. A storage device may include a memory device storing data and a memory controller controlling the memory device. Generally, there are two types of memory devices: volatile memory devices and nonvolatile memory devices.

Volatile memory devices may store data only when power is supplied thereto, and may lose stored data when power is not supplied. Examples of volatile memory devices include Static Random Access Memory (SRAM) and Dynamic Random Access Memory (DRAM).

Nonvolatile memory devices may retain stored data even when supply of power is interrupted or blocked. Examples of nonvolatile memory devices include Read Only Memory (ROM), Programmable ROM (PROM), Electrically Programmable ROM (EPROM), Electrically Erasable and Programmable ROM (EEPROM), and flash memory.

SUMMARY

Various embodiments of the present disclosure are directed to a storage device having improved security read performance and a method of operating the storage device.

According to an embodiment, a computing system may include a host and a storage device. The storage device may include a memory device including a write protection area. The host may perform an operation of providing, to the storage device, a first request regarding security write and write data in parallel with an operation of generating a host authentication code based on the write data and a key shared with the storage device.

According to an embodiment, a storage device may include a memory device and a memory controller. The memory device may include a write protection area. The memory controller may receive a first request and read information regarding a security read from a host, control the memory device to perform a read operation on the write protection area based on the first request and the read information, generate a device authentication code based on a key shared with the host and read data associated with the read operation, in parallel with transmitting a first response including the read data to the host, receive a second request from the host, and provide, to the host, the device authentication code in response to the second request.

BRIEF DESCRIPTION OF THE DRAWINGS

FIG. 7 is a diagram illustrating read information, such as that shown in each of FIGS. 5 and 6.

FIG. 14A and FIG. 14B are diagrams illustrating RPMB messages provided during the RPMB read operation shown in FIG. 13.

FIG. 16A to FIG. 16C are diagrams illustrating RPMB messages provided during the RPMB write operation shown in FIG. 15.

DETAILED DESCRIPTION

Specific structural and functional description is provided herein only to describe embodiments of the invention.

However, the invention may be configured and/or carried out in various ways. Thus, the invention is not limited to any of the disclosed embodiments nor to any specific detail described in this specification. Also, throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
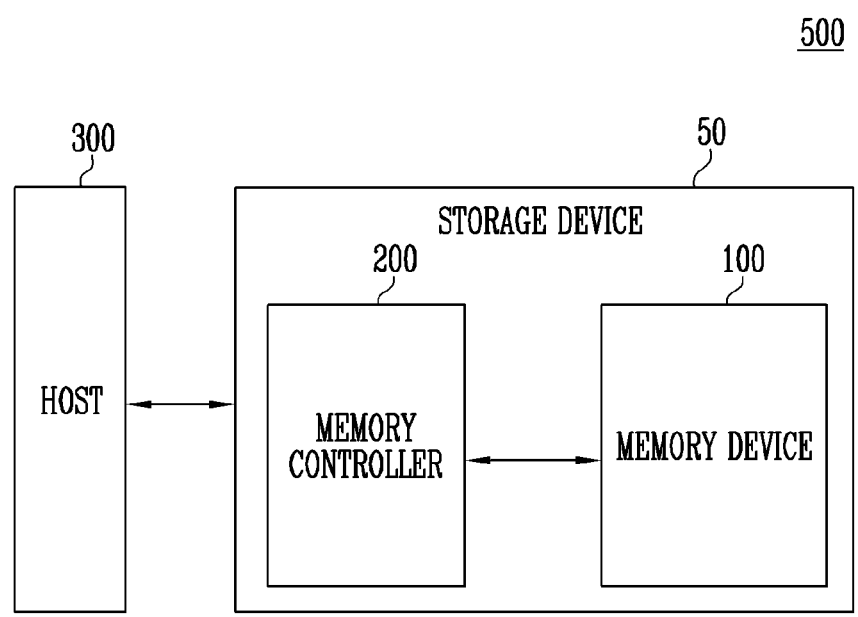
FIG. 1 is a diagram illustrating a computing system according to an embodiment of the present disclosure.

FIG. 1 is a diagram illustrating a computing system 500 according to an embodiment of the present disclosure.

Referring to FIG. 1, the computing system 500 may include a storage device 50 and a host 300.

The storage device 50 may include a memory device 100 and a memory controller 200 controlling operations of the memory device 100. The storage device 50 may store data in response to control of the host 300. Examples of the storage device 50 include a cellular phone, a smartphone, an MP3 player, a laptop computer, a desktop computer, a game player, a TV, a tablet PC, and an in-vehicle infotainment system.

The storage device 50 may be configured as any of various types of storage devices depending on a host interface which is a communication method with the host 300. For example, the storage device 50 may be configured as a solid state drive (SSD), a multimedia card in the form of a multimedia card (MMC), an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, or a memory stick.

The storage device 50 may be manufactured as any of various types of packages. For example, the storage device 50 may be manufactured as a package-on-package (POP), a system-in-package (SIP), a system-on-chip (SOC), a multi-chip package (MCP), a chip-on-board (COB), a wafer-level fabricated package (WFP), or a wafer-level stack package (WSP).

The memory device 100 may store data. The memory device 100 may operate in response to control of the memory controller 200. The memory device 100 may include a memory cell array including a plurality of memory cells storing data.

Each of the memory cells may be a Single-Level Cell (SLC) storing one bit of data, a Multi-Level Cell (MLC) storing two bits of data, a Triple-Level Cell (TLC) storing three bits of data, or a Quad-Level Cell (QLC) storing four bits of data.

The memory cell array may include a plurality of memory blocks, each of which may include a plurality of memory cells. Each memory block may include a plurality of pages. According to an embodiment, a page may be a unit for storing data in the memory device 100 or reading data stored in the memory device 100.

The memory block may be a unit for erasing data. According to an embodiment, the memory device 100 may be Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, Vertical NAND flash memory, NOR flash memory, resistive random access memory (RRAM), phase-change memory (PRAM), magnetoresistive random access memory (MRAM), ferroelectric random access memory (FRAM), or spin-transfer torque random access memory (STT-RAM). By way of example, it is assumed that the memory device 100 is NAND flash memory in the context of the following description.

The memory device 100 may receive a command and an address from the memory controller 200, and access an area selected by the address in the memory cell array. That is, the memory device 100 may perform an operation that the command instructs on the area selected by the address. For example, the memory device 100 may perform a write operation (or a program operation), a read operation, and an erase operation. During the program operation, the memory device 100 may program the area selected by the address with data. During the read operation, the memory device 100 may read data from the area selected by the address. During the erase operation, the memory device 100 may erase data stored in the area selected by the address.

According to an embodiment, the memory device 100 may include a write protection area. Write data that has verified integrity may be stored in the write protection area. Integrity of the write data may refer to a state in which write data received from the host 300 is not distorted or modulated.

The memory controller 200 may control general operation of the storage device 50.

When power is applied to the storage device 50, the memory controller 200 may execute firmware (FW). When the memory device 100 is a flash memory device, the memory controller 200 may execute firmware such as a flash translation layer (FTL) for controlling communication between the host 300 and the memory device 100.

According to an embodiment, the memory controller 200 may receive data and a logical block address (LBA) from the host 300 and translate the LBA into a physical block address (PBA) indicating an address of memory cells in which data is to be stored in the memory device 100.

For example, the memory controller 200 may control the memory device 100 to perform a program operation, a read operation or an erase operation in response to a request from the host 300. During the program operation, the memory controller 200 may provide the memory device 100 with a write command, a PBA, and data. During the read operation, the memory controller 200 may provide the memory device 100 with a read command and a PBA. During the erase operation, the memory controller 200 may provide the memory device 100 with an erase command and a PBA.

According to an embodiment, the memory controller 200 may generate and transfer a command, an address, and data to the memory device 100 regardless of a request from the host 300. For example, the memory controller 200 may provide the memory device 100 with a command, an address, and data to perform background operations, such as a program operation for wear leveling and a program operation for garbage collection.

According to an embodiment, the memory controller 200 may control at least two memory devices 100. The memory controller 200 may control the memory devices 100 according to an interleaving scheme so as to improve operation performance. In the interleaving scheme, operating periods of two or more memory devices 100 may at least partially overlap.

According to an embodiment, the memory controller 200 may receive a series of requests regarding security from the host 300.

According to an embodiment, the series of requests may include a first request and a second request. The first request may be for instructing a read operation on a write protection area of the memory device 100. The second request may be for collecting a result of the read operation. The first request and the second request are described below with reference to FIGS. 2 to 5.

According to an embodiment, the memory controller 200 may provide the host 300 with a first response indicating whether the first request has been received. The memory controller 200 may provide the host 300 with a second response including a device authentication code, in response to the second request.

The memory controller 200 may receive the first request and read information from the host 300. The memory controller 200 may control the memory device 100 to read data stored in the write protection area based on the read information, in response to the first request.

According to an embodiment, the read information may include values used for the read operation on the write protection area. For example, the read information may include a nonce value generated by the host 300 for security of a series of requests. A nonce is an arbitrary number that can only be used once in a secure communication. The read information may include an address value of a target area to be read among the write protection area. The read information may include a start address value of the target area. The read information may include a block count value which is the number of memory blocks in the target area.

According to an embodiment, the memory controller 200 may provide the host 300 with the second response including a copied value of the nonce value. The host 300 may determine whether the storage device 50 is an authorized sender/receiver of encrypted data by comparing the nonce value provided to the memory controller 200 with the copied value received from the memory controller 200.

The memory controller 200 may receive read data from the memory device 100.

The memory controller 200 may generate a device authentication code based on the received read data. The memory controller 200 may generate the device authentication code by using a message authentication code (MAC) algorithm based on a key shared with the host 300 and the read data. The device authentication code may be used for verifying read data integrity. The read data integrity may refer to a state in which read data provided by the memory controller 200 to the host 300 is not distorted or modulated.

The memory controller 200 may provide the host 300 with the read data received from the memory device 100.

According to an embodiment, the memory controller 200 may provide the host 300 with the first response and the read data, in response to the first request. The memory controller 200 may provide the host 300 with the first response after providing the host 300 with the read data.

According to another embodiment, the memory controller 200 may provide the host 300 with the second response and the read data, in response to the second request. The memory controller 200 may provide the host 300 with the second response after providing the host 300 with the read data.

The memory controller 200 may generate the device authentication code in parallel with providing the read data to the host 300.

The host 300 may communicate with the storage device 50 using at least one of various communication methods such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

According to an embodiment, the host 300 may provide the memory controller 200 with the series of requests regarding security read. The series of requests may include the first request and the second request.

The host 300 may provide the memory controller 200 with the first request and the read information. The host 300 may receive the first response from the memory controller 200. The host 300 may provide the memory controller 200 with the second request in response to the first response. The host 300 may receive the second response from the memory controller 200.

According to an embodiment, the host 300 may receive the first response, together with the read data from the memory controller 200. The host 300 may receive the first response after receiving the read data from the memory controller 200.

According to an embodiment, the host 300 may receive the second response, together with the read data from the memory controller 200. The host 300 may receive the second response after receiving the read data from the memory controller 200.

According to another embodiment, the memory controller 200 may generate the device authentication code using the write data received from the host 300 and the key shared with the host 300. The memory controller 200 may verify integrity of the write data based on a result of comparing the device authentication code with a host authentication code received from the host 300. The memory controller 200 may control the memory device 100 to store write data that has verified integrity in the write protection area in response to the request from the host 300. The memory controller 200 may provide the host 300 with a result of a program operation on the write data in response to the request from the host 300. The result of the program operation may include information as to whether the write data has integrity and information as to whether the program operation has passed or failed.

According to another embodiment, the host 300 may provide the storage device 50 with the write data, together with the series of requests regarding security write. The host 300 may generate the host authentication code based on the key shared with the storage device 50 and the write data. The host 300 may provide the storage device 50 with the generated host authentication code. The host 300 may receive responses to the series of requests from the storage device 50. The host 300 may receive the result of the program operation together with the responses from the storage device 50.

Figure 2:
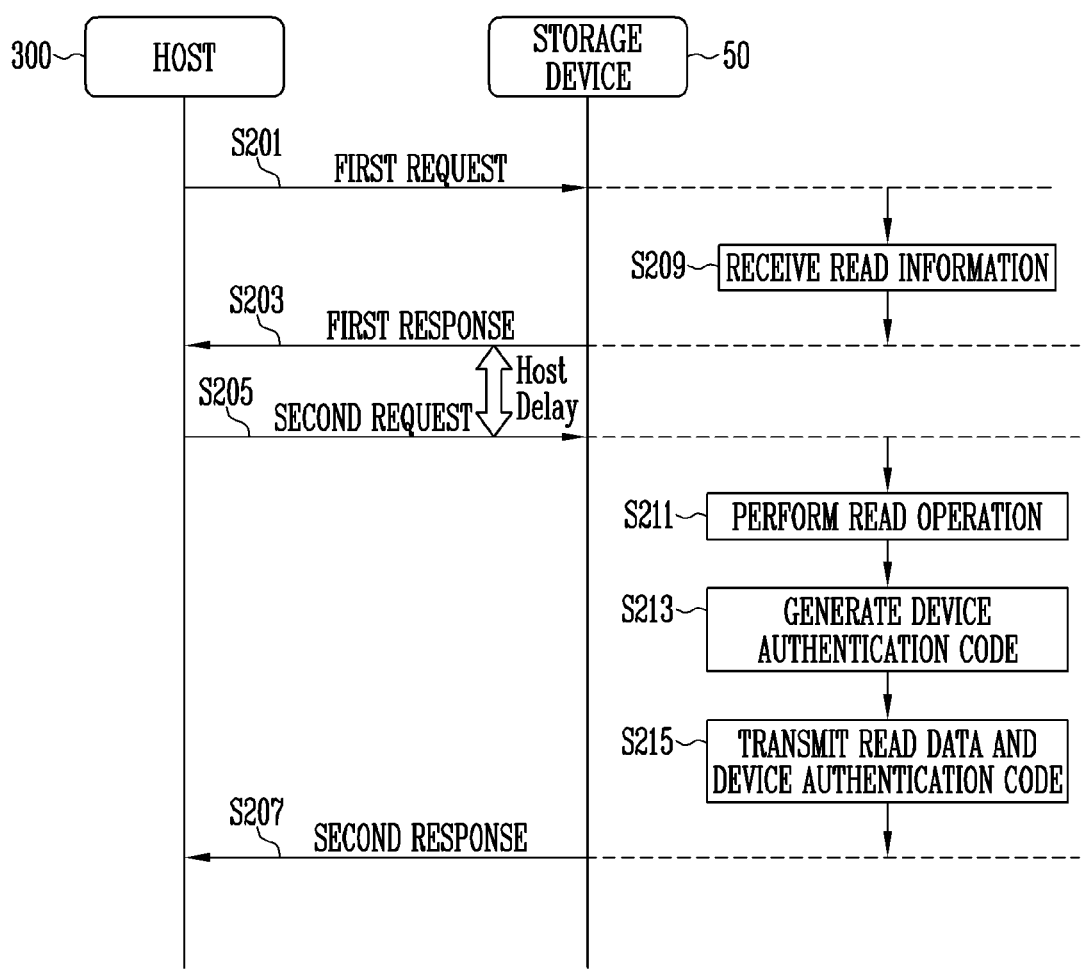
FIG. 2 is a flowchart illustrating a security read operation according to an embodiment.

FIG. 2 is a flowchart illustrating a security read operation according to an embodiment.

Referring to FIG. 2, the host 300 may provide the storage device 50 with a series of requests for security read. The storage device 50 may read data stored in a write protection area and provide the host 300 with the read data, in response to the series of requests.

At step S201, the host 300 may provide the storage device 50 with a first request among the series of requests. The first request may be for reading data stored in the write protection area of the storage device 50.

At step S203, the storage device 50 may provide the host 300 with a first response indicating whether the first request has been received. The host 300 may determine whether the storage device 50 has received the first request based on the first response.

At step S205, the host 300 may provide the storage device 50 with a second request in response to the first response. The second request may be for collecting a result of a read operation performed by the storage device 50 in response to the first request.

At step S207, the storage device 50 may provide the host 300 with a second response in response to the second request. According to an embodiment, the storage device 50 may provide the host 300 with read data and the second response. The storage device 50 may provide the host 300 with the second response after providing the host 300 with the read data.

The storage device 50 may provide the host 300 with a second response including a device authentication code. The storage device 50 may copy a nonce value in read information and provide the host 300 with a second response including the copied value.

At step S209, the storage device 50 may receive the read information from the host 300. The read information may include values used for reading data stored in the write protection area.

For example, the read information may include a nonce value, an address value, and a block count value. The nonce value may be generated by the host 300 for security of the series of requests. The address value may indicate an address of a target area to be read among the write protection area. According to an embodiment, the address value may indicate a start address of the target area. The block count value may be the number of memory blocks in the target area.

At step S211, the storage device 50 may perform the read operation based on the read information in response to the second request. The storage device 50 may read data stored in the target area based on the address value and the block count value in the read information.

At step S213, the storage device 50 may generate the device authentication code after the read operation is completed. The storage device 50 may generate the device authentication code based on a key shared with the host 300 and the read data. The device authentication code may be used for verifying integrity of the read data.

At step S215, the storage device 50 may transmit the read data and the device authentication code to the host 300. According to an embodiment, the storage device 50 may transmit the read data to the host 300 and may transmit the second response including the device authentication code to the host 300.

According to an embodiment, the host 300 may compare the nonce value that is included in the read information provided to the storage device 50 with the copied value that is included in the second response. The host 300 may determine whether the series of requests and the responses regarding the security read are properly exchanged with the storage device 50 based on the comparison result. In other words, based on the comparison result, the host 300 may prevent a replay attack, in which a device other than the storage device 50 intercepts the series of requests and provides a response to the host 300.

As shown in FIG. 2, a host delay may occur between the time when the host 300 receives the first response from the storage device 50 and the time when the host 300 provides the storage device 50 with the second request in response to the received first response.

Figure 3:
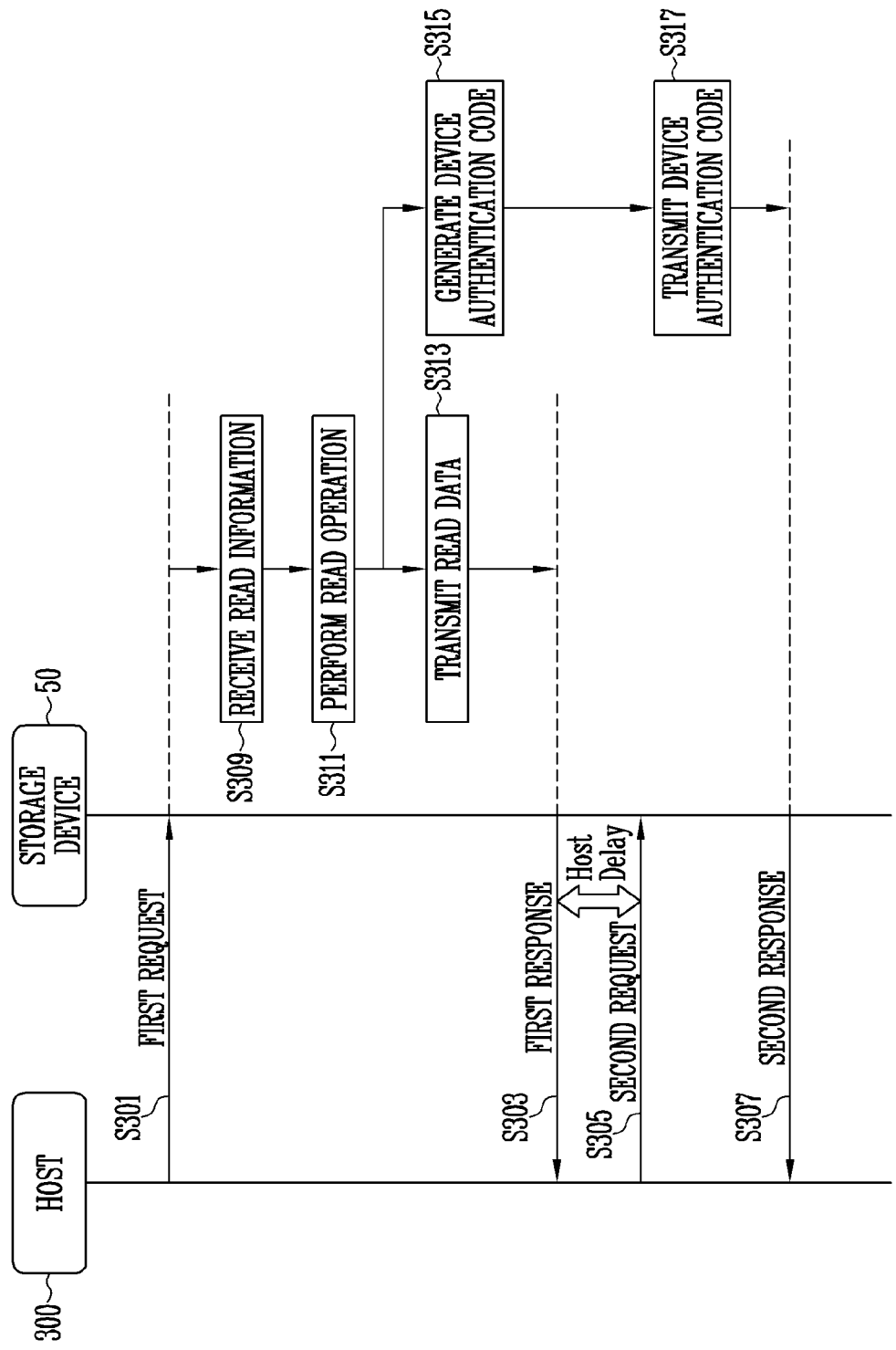
FIG. 3 is a flowchart illustrating a security read operation according to an embodiment.

FIG. 3 is a flowchart illustrating a security read operation according to an embodiment.

Referring to FIG. 3, at step S301, the host 300 may provide the storage device 50 with a first request among a series of requests regarding security read. The first request may be for reading data stored in a write protection area of the storage device 50.

At step S303, the storage device 50 may provide the host 300 with a first response indicating whether the first request has been received. According to an embodiment, the storage device 50 may provide the host 300 with read data and the first response. The storage device 50 may provide the host 300 with the first response after providing the host 300 with the read data. The host 300 may determine whether the storage device 50 has received the first request based on the first response.

At step S305, the host 300 may provide the storage device 50 with a second request in response to the first response. The second request may be for collecting a result of a read operation performed by the storage device 50 in response to the first request.

At step S307, the storage device 50 may provide the host 300 with a second response in response to the second request. The storage device 50 may provide the host 300 with a second response including a device authentication code. The storage device 50 may provide the host 300 with a second response including a copied value of a nonce value in read information.

At step S309, the storage device 50 may receive the read information from the host 300. The read information may include values used for reading the data stored in the write protection area.

For example, the read information may include a nonce value, an address value, and a block count value. The nonce value may be generated by the host 300 for security of the series of requests. The address value may indicate an address of a target area to be read among the write protection area. According to an embodiment, the address value may indicate a start address of the target area. The block count value may be the number of memory blocks in the target area.

At step S311, the storage device 50 may perform the read operation based on the read information in response to the first request. The storage device 50 may read data stored in the target area based on the address value and the block count value in the read information.

At step S313, the storage device 50 may transmit the read data to the host 300. According to an embodiment, the storage device 50 may transmit the first response to the host 300 after transmitting the read data to the host 300.

At step S315, the storage device 50 may generate the device authentication code based on a key shared with the host 300 and the read data. The device authentication code may be used for verifying integrity of the read data.

At step S317, the storage device 50 may transmit the device authentication code to the host 300. According to an embodiment, the storage device 50 may transmit the second response including the device authentication code to the host 300.

As shown in FIG. 3, step S313 may be performed in parallel with step S315. In other words, the storage device 50 may transmit the read data to the host 300 in parallel with the generation of the device authentication code. Thus, the total time required for security read may be reduced by the time during which the transmission of the read data overlaps the generation of the device authentication code.

A host delay may occur between the time when the host 300 receives the first response from the storage device 50 and the time when the host 300 provides the storage device 50 with the second request in response to the received first response.

As shown in FIG. 3, the storage device 50 may generate the device authentication code during the host delay, thereby reducing the total time required for security read.

Figure 4:
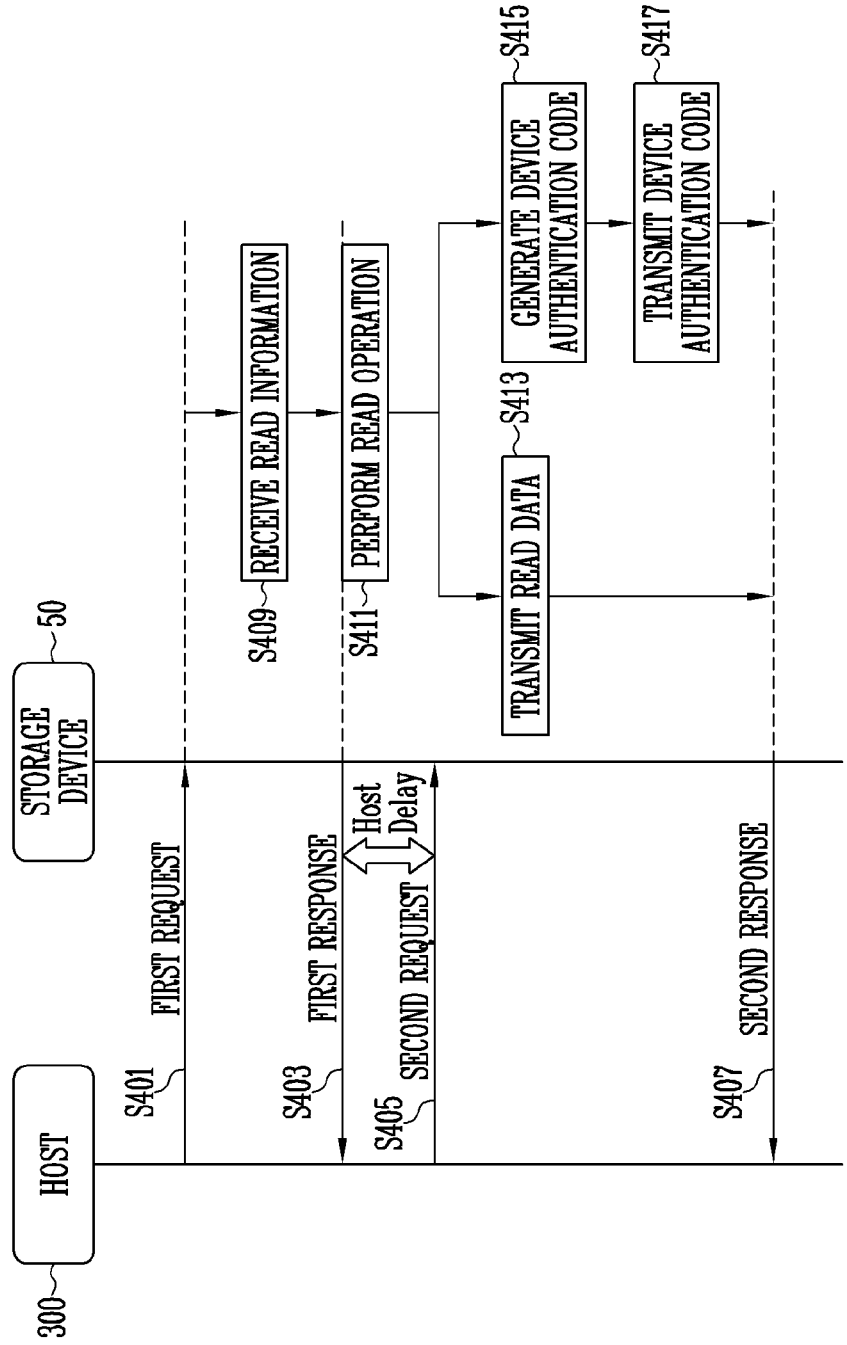
FIG. 4 is a flowchart illustrating a security read operation according to an embodiment.

FIG. 4 is a flowchart illustrating a security read operation according to an embodiment.

Referring to FIG. 4, at step S401, the host 300 may provide the storage device 50 with a first request among a series of requests regarding security read. The first request may be for reading data stored in a write protection area of the storage device 50.

At step S403, the storage device 50 may provide the host 300 with a first response indicating whether the first request has been received. According to an embodiment, the storage device 50 may provide the host 300 with the first response when the reception of read information is completed. The host 300 may determine whether the storage device 50 has received the first request based on the first response.

At step S405, the host 300 may provide the storage device 50 with a second request in response to the first response. The second request may be for collecting a result of a read operation performed by the storage device 50 in response to the first request.

At step S407, the storage device 50 may provide the host 300 with a second response in response to the second request. The storage device 50 may provide the host 300 with a second response including a device authentication code. The storage device 50 may provide the host 300 with a second response including a copied value of a nonce value in the read information.

At step S409, the storage device 50 may receive the read information from the host 300. The read information may include values used for reading data stored in the write protection area.

For example, the read information may include a nonce value, an address value, and a block count value. The nonce value may be generated by the host 300 for security of the series of requests. The address value may indicate an address of a target area to be read among the write protection area. According to an embodiment, the address value may indicate a start address of the target area. The block count value may be the number of memory blocks included in the target area.

At step S411, the storage device 50 may perform the read operation based on the read information in response to the first request. The storage device 50 may read data stored in the target area based on the address value and the block count value in the read information.

At step S413, the storage device 50 may transmit the read data to the host 300 in response to the second request. According to an embodiment, the storage device 50 may transmit the second response to the host 300 after transmitting the read data to the host 300.

At step S415, the storage device 50 may generate the device authentication code based on a key shared with the host 300 and the read data. When the read operation at step S411 is completed, the storage device 50 may initiate the generation of the device authentication code independent of whether the second request has been received. The device authentication code may be used for verifying integrity of the read data.

At step S417, the storage device 50 may transmit the device authentication code to the host 300. According to an embodiment, the storage device 50 may transmit the second response including the device authentication code to the host 300.

As shown in FIG. 4, step S413 may be performed in parallel with step S415. In other words, the storage device 50 may transmit the read data to the host 300 in parallel with the generation of the device authentication code. Thus, the total time required for security read may be reduced by the time during which the transmission of the read data overlaps the generation of the device authentication code.

A host delay may occur between the time when the host 300 receives the first response from the storage device 50 and the time when the host 300 provides the storage device 50 with the second request in response to the received first response.

As shown in FIG. 4, the storage device 50 may perform the read operation or generate the device authentication code during the host delay, thereby reducing the total time required for security read.

Figure 5:
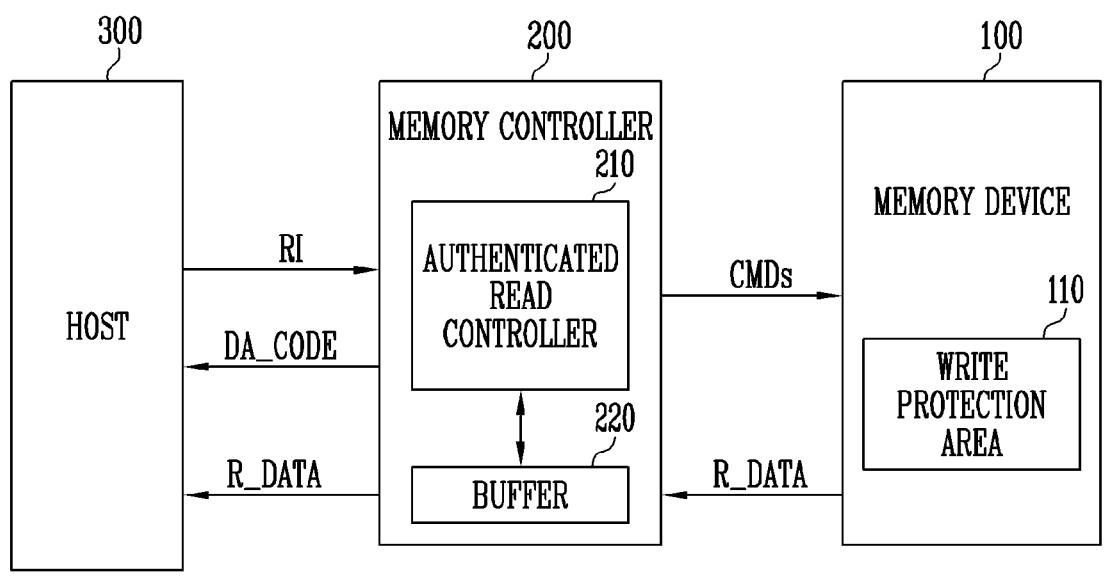
FIG. 5 is a diagram illustrating a configuration and operations of a storage device, such as that shown in FIG. 1, according to an embodiment.

FIG. 5 is a diagram illustrating a configuration and operations of the storage device 50 shown in FIG. 1 according to an embodiment.

Referring to FIG. 5, the memory device 100 may include a write protection area 110. Write data that has verified integrity may be stored in the write protection area 110. Integrity of the write data may refer to a state in which write data received from the host 300 is not distorted or modulated.

According to an embodiment, the memory controller 200 may include an authenticated read controller 210 and a buffer 220.

The authenticated read controller 210 may receive a series of requests regarding security read from the host 300. The authenticated read controller 210 may provide the host 300 with responses corresponding to the series of requests.

According to an embodiment, the series of requests may include a first request and a second request. The first request may be for instructing a read operation on the write protection area 110 of the memory device 100. The second request may be for collecting a result of the read operation.

According to an embodiment, the authenticated read controller 210 may provide the host 300 with a first response indicating whether the first request has been received, in response to the first request. The authenticated read controller 210 may provide the host 300 with a second response including a device authentication code DA_CODE in response to the second request.

The authenticated read controller 210 may receive the first request and read information RI from the host 300. The authenticated read controller 210 may provide the memory device 100 with a read command on data stored in the write protection area 110 based on the read information RI, in response to the first request.

According to an embodiment, the read information RI may include values used for the read operation on the write protection area 110. For example, the read information RI may include a nonce value generated by the host 300 for security of the series of requests. The read information RI may include an address value of a target area to be read among the write protection area 110. The read information RI may include a start address value of the target area. The read information RI may include a block count value which is the number of memory blocks included in the target area.

According to an embodiment, the authenticated read controller 210 may provide the host 300 with a second response including a copied value of the nonce value. The host 300 may determine whether the storage device is an authorized sender/receiver of encrypted data by comparing the nonce value in the read information RI which is provided to the authenticated read controller 210 with the copied value received from the authenticated read controller 210. In other words, by comparing the nonce value with the copied value, the host 300 may prevent a replay attack, in which a device other than the storage device intercepts the series of requests and provides a response to the host 300.

The authenticated read controller 210 may generate the device authentication code DA_CODE based on read data R_DATA received from the buffer 220. The authenticated read controller 210 may generate the device authentication code DA_CODE by using a Message Authentication Code (MAC) algorithm based on a key shared with the host 300 and the read data R_DATA. The device authentication code DA_CODE may be used for verifying integrity of the read data R_DATA. The integrity of the read data R_DATA may refer to a state in which the read data R_DATA that the authenticated read controller 210 provides to the host 300 is not distorted or modulated.

The authenticated read controller 210 may provide the host 300 with the read data R_DATA stored in the buffer 220. The authenticated read controller 210 may provide the host 300 with the read data R_DATA in response to the first request or the second request.

According to an embodiment, as described with reference to FIG. 3, the authenticated read controller 210 may provide the host 300 with the first response and the read data R_DATA, in response to the first request. The authenticated read controller 210 may provide the host 300 with the first response after providing the host 300 with the read data R_DATA.

According to an embodiment, as described with reference to FIG. 4, the authenticated read controller 210 may provide the host 300 with the second response and the read data R_DATA in response to the second request. The authenticated read controller 210 may provide the host 300 with the second response after providing the host 300 with the read data R_DATA.

The authenticated read controller 210 may generate the device authentication code DA_CODE in parallel with providing the read data R_DATA to the host 300.

The buffer 220 may store the data R_DATA read from the write protection area 110. The buffer 220 may provide the host 300 with the read data R_DATA stored according to control of the authenticated read controller 210.

Figure 6:
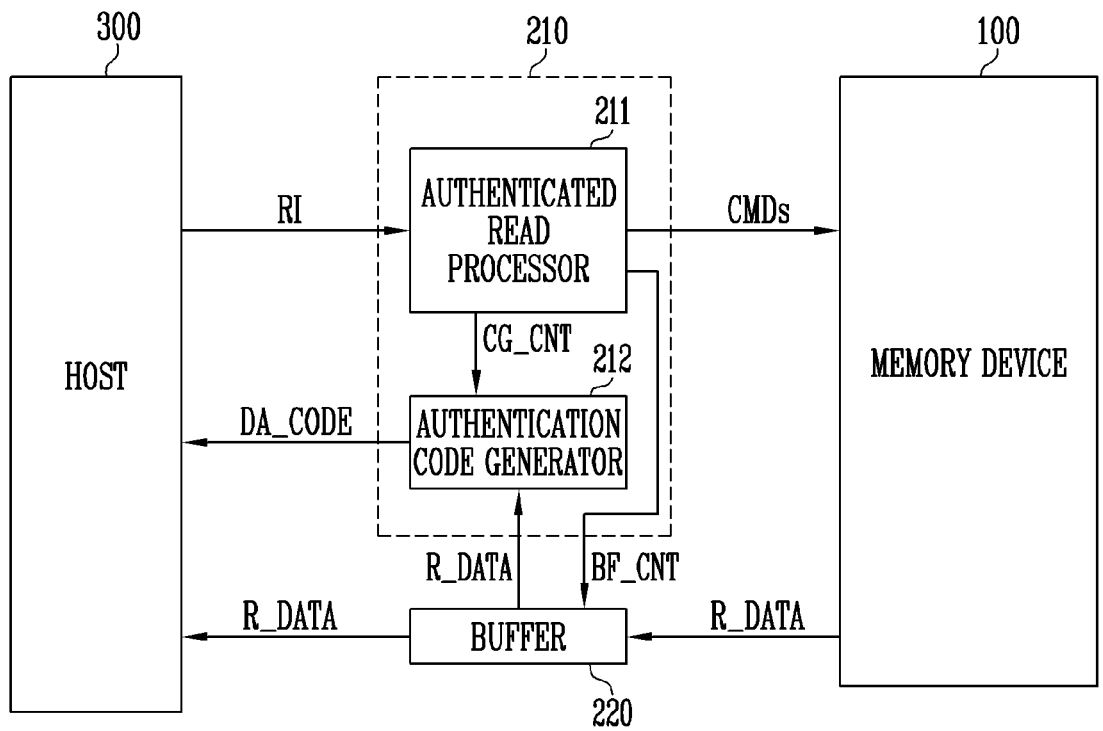
FIG. 6 is a diagram illustrating a configuration and operations of a memory controller, such as that shown in FIG. 5.

FIG. 6 is a diagram illustrating a configuration and operations of the memory controller 200 shown in FIG. 5.

Referring to FIG. 6, the memory controller 200 may include the authenticated read controller 210 and the buffer 220.

According to an embodiment, the authenticated read controller 210 may include an authenticated read processor 211 and an authentication code generator 212. According to another embodiment, the authentication code generator 212 may be located externally to the authenticated read controller 210.

The authenticated read processor 211 may receive the series of requests regarding security read from the host 300. The authenticated read processor 211 may provide the host 300 with the responses corresponding to the series of requests.

The authenticated read processor 211 may receive a first request and the read information RI among the series of requests. The authenticated read processor 211 may provide the memory device 100 with a command to read data stored in the write protection area of the memory device 100 based on the read information RI. The authenticated read processor 211 may provide the host 300 with a first response indicating whether the first request has been received, in response to the first request.

The authenticated read processor 211 may receive a second request among the series of requests. The authenticated read processor 211 may provide the host 300 with a second response indicating whether the second request has been received.

The authenticated read processor 211 may provide the buffer 220 with a buffer control signal BF_CNT. The authenticated read processor 211 may control operations of the buffer 220 by the buffer control signal BF_CNT. According to an embodiment, the authenticated read processor 211 may control the buffer 220 to provide the host 300 with the read data R_DATA, in response to the first request. According to an embodiment, the authenticated read processor 211 may control the buffer 220 to provide the host 300 with the read data R_DATA, in response to the second request.

The authenticated read processor 211 may provide the authentication code generator 212 with an authentication code generator control signal CG_CNT. The authenticated read processor 211 may control operations of the authentication code generator 212 by the authentication code generator control signal CG_CNT. According to an embodiment, the authenticated read processor 211 may control the authentication code generator 212 to provide the host 300 with the device authentication code DA_CODE, in response to the second request.

The authentication code generator 212 may generate the device authentication code DA_CODE based on the read data R_DATA received from the buffer 220, in response to the authentication code generator control signal CG_CNT. The authentication code generator 212 may generate the device authentication code DA_CODE based on a key shared with the host 300 and the read data R_DATA. The shared key value may be previously set. The shared key value may be changed in response to a request of the host 300. The authentication code generator 212 may provide the host 300 with the generated device authentication code DA_CODE, in response to the authentication code generator control signal CG_CNT.

The buffer 220 may receive the read data R_DATA from the memory device 100 and may store the received read data R_DATA therein. The buffer 220 may provide the stored read data R_DATA to the host 300 or the authentication code generator 212 in response to the buffer control signal BF_CNT.

Figure 7:
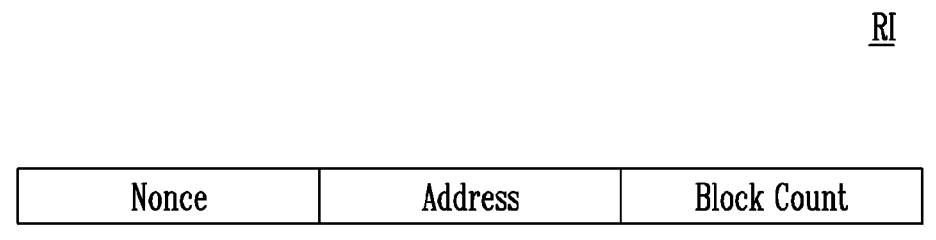

FIG. 7 is a diagram illustrating the read information RI shown in each of FIGS. 5 and 6.

Referring to FIG. 7, the read information RI may include values used for the read operation on a write protection area. For example, the read information RI may include a nonce value, an address value, and a block count value.

The nonce value may be an arbitrary value that a host generates for security of a series of requests provided by the host to a storage device. The nonce value may be used for preventing a replay attack.

The address value may be of a target area to be read among the write protection area. The address value may be a start address value of the target area.

The block count value may be the number of memory blocks included in the target area.

A target area may be determined among the write protection area by the address value and the block count value.

Figure 8:
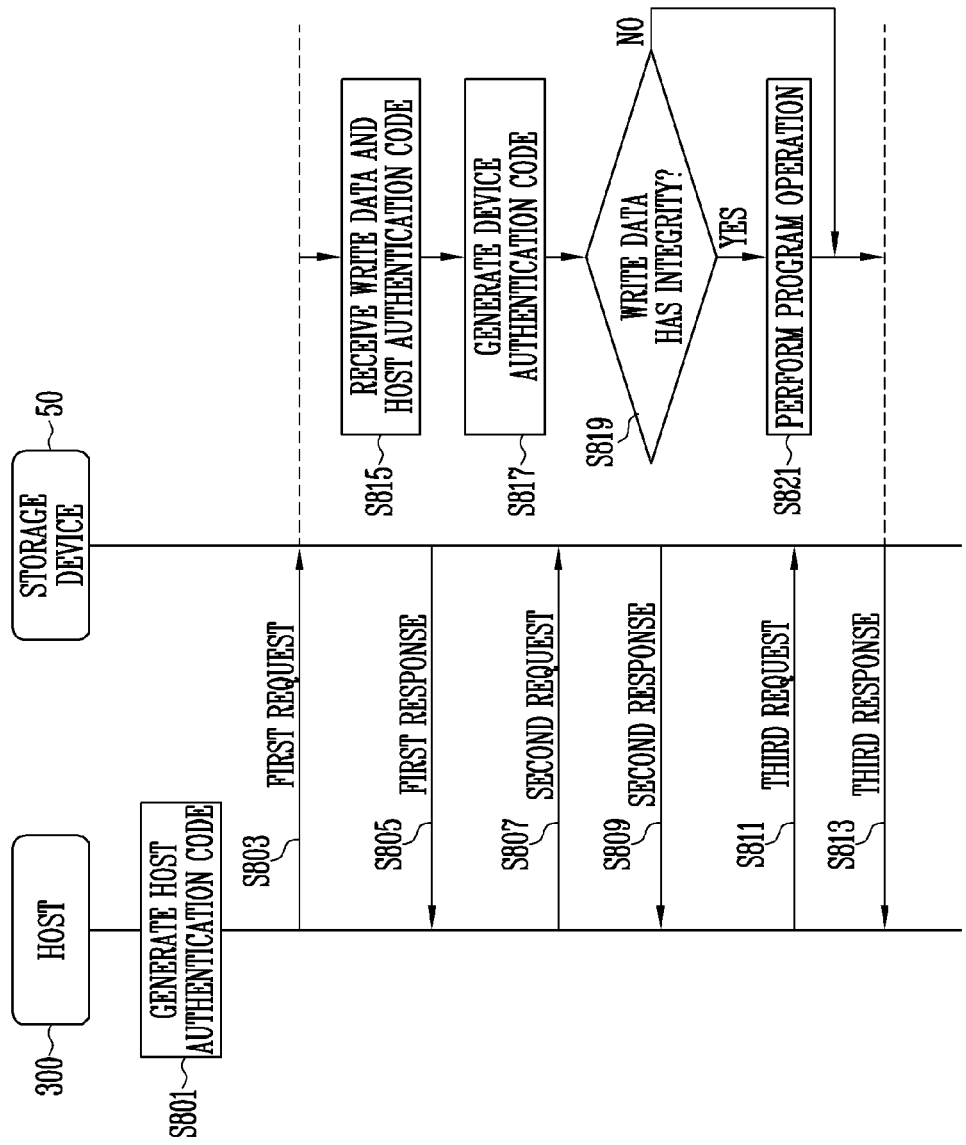
FIG. 8 is a diagram illustrating security write according to an embodiment.

FIG. 8 is a diagram illustrating security write according to an embodiment.

Referring to FIG. 8, at step S801, the host 300 may generate a host authentication code based on a key shared with the storage device 50 and write data. The host 300 may generate the host authentication code by using a message authentication code (MAC) algorithm. The host authentication code may be used for verifying integrity of the write data. In other words, the host authentication code may be used for verifying whether the write data is distorted or modulated during the transmission of the write data from the host 300 to the storage device 50.

The host 300 may provide the storage device 50 with a series of first to third requests for security write.

At step S803, the host 300 may provide the storage device 50 with the first request. The first request may be for programming the write data into a write protection area of the storage device 50. The host 300 may provide the storage device with the first request, the write data, and the host authentication code.

At step S805, the storage device 50 may provide the host 300 with a first response indicating whether the first request has been received, in response to the first request.

At step S807, the host 300 may provide the storage device 50 with the second request in response to the first response. The second request may be for checking whether a result of a program operation on the write data is ready to be collected.

At step S809, the storage device 50 may provide the host 300 with a second response indicating whether the second request has been received, in response to the second request.

At step S811, the host 300 may provide the storage device 50 with the third request in response to the second response. The third request may be for the result of the program operation on the write data.

At step S813, the storage device 50 may provide the host 300 with a third response including the result of the program operation on the write data, in response to the third request. The result of the program operation may include information indicating whether the program operation has passed or failed. The result of the program operation may include information indicating whether the write data has integrity.

At step S815, the storage device 50 may receive the write data and the host authentication code, together with the first request from the host 300.

At step S817, the storage device 50 may generate a device authentication code based on a key shared with the host 300 and the received write data. The storage device 50 may generate the device authentication code by using a message authentication code (MAC) algorithm.

At step S819, the storage device 50 may verify whether the write data has integrity. According to a result of verification, when it is determined that the write data has integrity, the process flow may proceed to step S821. Alternatively, when it is determined that the write data does not have integrity, the process flow may proceed to step S813.

At step S821, the storage device 50 may perform a program operation of storing the write data in the write protection area. After the program operation is performed, the storage device 50 may generate information indicating whether the program operation has passed or failed. The generated information may be transmitted to the host at step S813.

Figure 9:
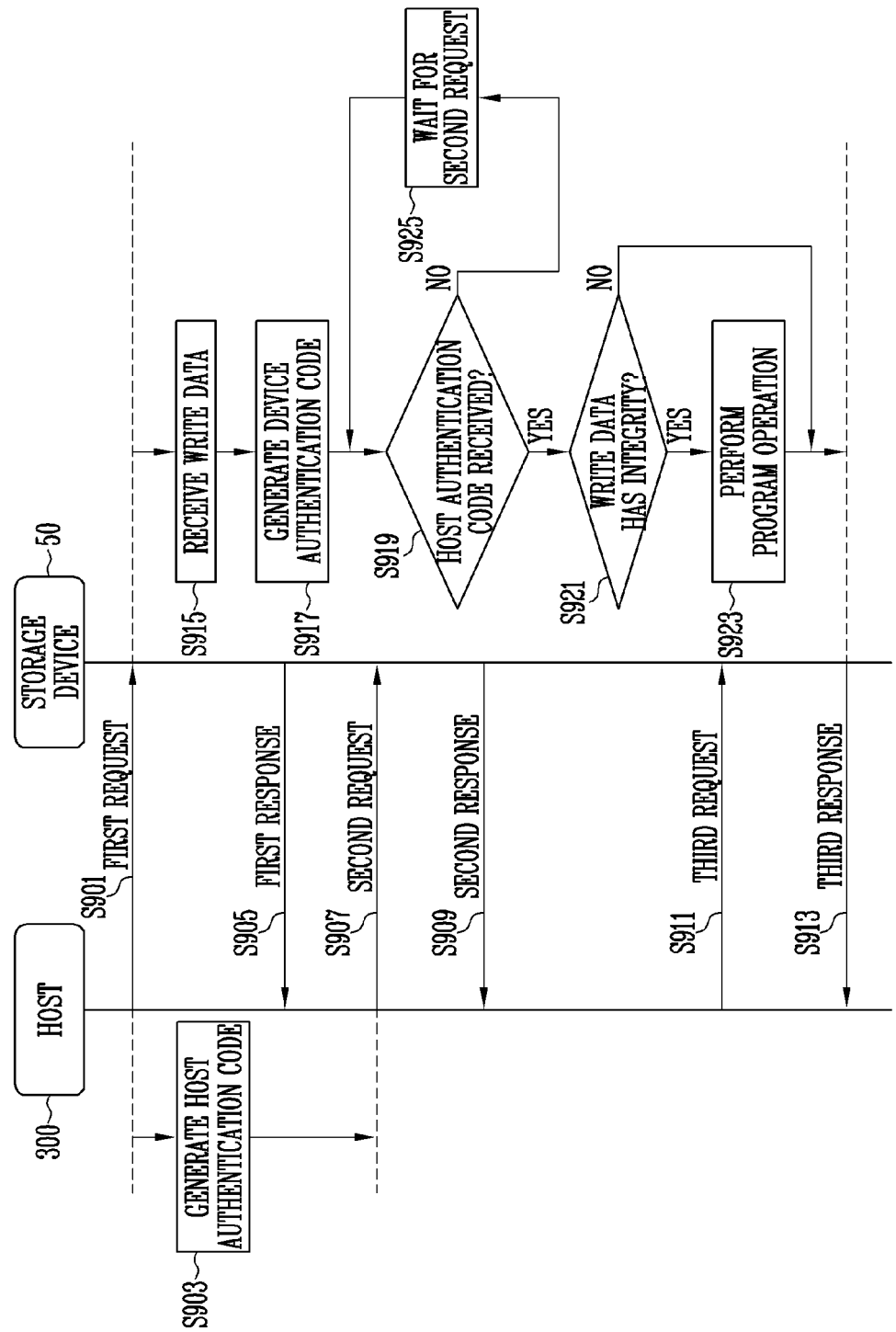
FIG. 9 is a diagram illustrating security write according to an embodiment.

FIG. 9 is a diagram illustrating security write according to an embodiment.

Referring to FIG. 9, the host 300 may provide the storage device 50 with a series of first to third requests for security write.

At step S901, the host 300 may provide the storage device 50 with the first request. The first request may be for programming write data into a write protection area of the storage device 50. The host 300 may provide the storage device 50 with the first request and the write data.

At step S903, the host 300 may generate a host authentication code after providing the storage device 50 with the first request. The host 300 may generate the host authentication code based on a key shared with the storage device 50 and the write data. The host 300 may generate the host authentication code by using a message authentication code (MAC) algorithm. The host 300 may provide the write data to the storage device 50 in parallel with the generation of the host authentication code. In other words, the host 300 may initiate the generation of the host authentication code when the write data is transmitted to the storage device 50.

According to various embodiments, the storage device 50 may generate a device authentication code at step S917 when the host 300 generates the host authentication code at step S903. In other words, the generation of the host authentication code may be performed in parallel with the generation of the device authentication code.

At step S905, the storage device 50 may provide the host 300 with a first response indicating whether the first request has been received, in response to the first request.

At step S907, the host 300 may provide the storage device 50 with the second request in response to the first response when the generation of the host authentication code is completed. The second request may be for checking whether a result of a program operation on the write data is ready to be collected. The host 300 may provide the storage device 50 with the second request and the host authentication code.

At step S909, the storage device 50 may provide the host 300 with a second response indicating whether the second request has been received, in response to the second request.

At step S911, the host 300 may provide the storage device 50 with the third request in response to the second response. The third request may be for the result of the program operation on the write data.

At step S913, the storage device 50 may provide the host 300 with a third response including the result of the program operation on the write data. The result of the program operation may include information indicating whether the program operation has passed or failed. The result of the program operation may include information indicating whether the write data has integrity.

At step S915, the storage device 50 may receive the write data, together with the first request from the host 300.

At step S917, the storage device 50 may generate a device authentication code based on a key shared with the host 300 and the received write data. The storage device 50 may generate the device authentication code by using a message authentication code (MAC) algorithm.

At step S919, the storage device 50 may determine whether the host authentication code has been received from the host 300. When it is determined that the host authentication code has been received, the process flow may proceed to step S921. Alternatively, when it is determined that the host authentication code has not been received, the process flow may proceed to step S925.

At step S921, the storage device 50 may verify whether the write data has integrity. According to a result of verification, when it is determined that the write data has integrity, the process flow may proceed to step S923. Alternatively, when it is determined that the write data does not have integrity, the process flow may proceed to step S913.

At step S923, the storage device 50 may perform a program operation of storing the write data in the write protection area. After the program operation is performed, the storage device 50 may generate information indicating whether the program operation has passed or failed. The generated information may be transmitted to the host at step S913.

At step S925, the storage device 50 may wait until the host authentication code is received together with the second request from the host 300. After performing step S925, the process flow may proceed to step S919.

According to an embodiment, the generation of the host authentication code may be performed in parallel with the transmission of the write data from the host 300 to the storage device 50. Accordingly, the time required to perform a security write operation may be reduced by the time during which the generation of the host authentication code overlaps the transmission of the read data.

According to an embodiment, the generation of the host authentication code may be performed in parallel with the generation of the device authentication code of the storage device 50. Accordingly, the time required to perform the security write operation may be reduced by the time during which the generation of the host authentication code overlaps the generation of the device authentication code.

Figure 10:
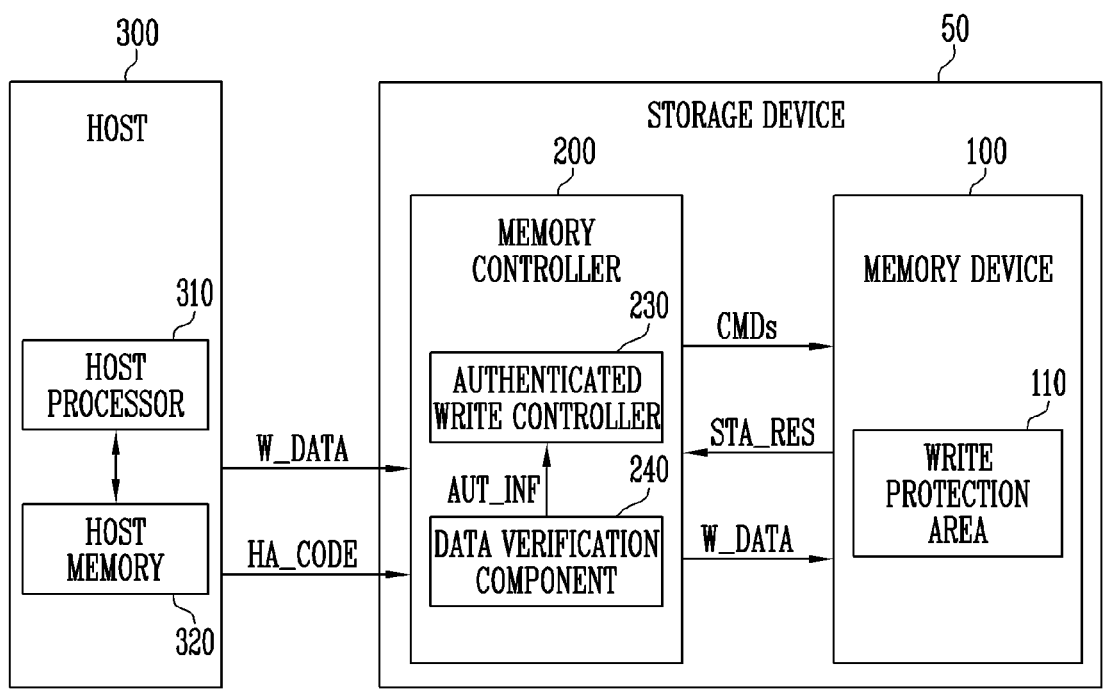
FIG. 10 is a diagram illustrating a configuration and operations of a storage device, such as that shown in FIG. 1, according to an embodiment.

FIG. 10 is a diagram illustrating a configuration and operations of a system 500 including the host 300 and the storage device 50 shown in FIG. 1 according to an embodiment.

Referring to FIG. 10, the storage device 50 may include the memory device 100 and the memory controller 200.

According to an embodiment, the memory device 100 may include the write protection area 110.

The write protection area 110 may be a region in which write data W_DATA that has verified integrity is stored. Integrity may refer to a state in which the write data W_DATA received from the host 300 is not distorted or modulated.

The memory device 100 may perform a program operation of storing the write data W_DATA that has the verified integrity in the write protection area 110 in response to a program command received from the memory controller 200. The memory device 100 may provide the memory controller 200 with a state read response STA_ including information that indicates whether the program operation has passed or failed, in response to a state read command received from the memory controller 200.

According to an embodiment, the memory controller 200 may include an authenticated write controller 230 and a data verification component 240.

The authenticated write controller 230 may provide the host 300 with the responses to the series of requests regarding security write which are received from the host 300. The series of requests regarding the security write may include the first to third requests described with reference to FIGS. 2 and 9.

For example, the authenticated write controller 230 may receive the first request and the write data W_DATA from the host 300. The authenticated write controller 230 may provide the host 300 with a first response indicating whether the first request has been received, in response to the first request received from the host 300. The first request may be for programming the write data W_DATA into the write protection area 110 of the memory device 100.

The authenticated write controller 230 may receive the second request and a host authentication code HA_CODE from the host 300. The authenticated write controller 230 may provide the host 300 with a second response indicating whether the second request has been received, in response to the second request received from the host 300. The second request may be for checking whether a result of the program operation on the write data W_DATA is ready to be collected.

The authenticated write controller 230 may receive the third request to request the result of the program operation on the write data W_DATA from the host 300. The authenticated write controller 230 may provide the host 300 with a third response including the result of the program operation on the write data W_DATA, in response to the third request received from the host 300.

The authenticated write controller 230 may control the memory device 100 to store the write data W_DATA in the write protection area 110. For example, the authenticated write controller 230 may determine whether the write data W_DATA has integrity based on authentication information AUT_INF received from the data verification component 240. The authenticated write controller 230 may provide the memory device 100 with a program command about the write data W_DATA that has the verified integrity.

After providing the memory device 100 with the program command, the authenticated write controller 230 may provide the memory device 100 with the state read command to receive the result of the program operation. The authenticated write controller 230 may receive the state read response STA_ indicating the result of the program operation from the memory device 100. The state read response STA_ may include information indicating whether the program operation has passed or failed.

The authenticated write controller 230 may provide the host 300 with a response including the result of the program operation of storing the write data W_DATA in the write protection area 110. The result of the program operation may include information as to whether the write data W_DATA has the integrity and as to whether the program operation has passed or failed.

The data verification component 240 may generate the authentication information AUT_INF indicating the integrity of the write data W_DATA received from the host 300. The data verification component 240 may provide the authenticated write controller 230 with the authentication information AUT_INF.

More specifically, the data verification component 240 may generate a device authentication code by using the write data W_DATA received from the host 300 and a key shared with the host 300. The data verification component 240 may generate the authentication information AUT_INF indicating the integrity of the write data W_DATA based on a result of comparing the host authentication code HA_CODE received from the host 300 with the device authentication code. The host authentication code HA_CODE may be received when the authenticated write controller 230 receives the second request from the host 300.

According to an embodiment, the host 300 may include a host processor 310 and host memory 320.

The host processor 310 may provide the memory controller 200 with the series of requests regarding security write. The series of requests may include first to third requests as described with reference to FIGS. 2 and 9.

The host processor 310 may provide the memory controller 200 with the write data W_DATA stored in the host memory 320 and the first request.

After providing the memory controller 200 with the first request, the host processor 310 may generate the host authentication code HA_CODE based on a key shared with the storage device 50 and the write data W_DATA.

The host processor 310 may provide the write data W_DATA to the memory controller 200 in parallel with the generation of the host authentication code HA_CODE. In other words, the generation of the host authentication code HA_CODE may be performed in parallel with the transmission of the write data W_DATA.

When the generation of the host authentication code HA_CODE is completed, the host processor 310 may provide the memory controller 200 with the second request and the host authentication code HA_CODE in response to the first response received from the memory controller 200.

The host processor 310 may provide the memory controller 200 with the third request regarding the result of the program operation on the write data W_DATA, in response to the second response received from the memory controller 200.

The host memory 320 may store the write data W_DATA to be provided to the memory controller 200.

According to an embodiment, the generation of the host authentication code HA_CODE by the host processor 310 may be performed in parallel with the transmission of the write data W_DATA to the storage device 50. Accordingly, the time required to perform a security write operation may be reduced by the time in which the generation of the host authentication code HA_CODE overlaps the transmission of the write data W_DATA.

According to an embodiment, the generation of the host authentication code HA_CODE by the host processor 310 may be performed in parallel with the generation of the device authentication code by the data verification component 240. Accordingly, the time required to perform the security write operation may be reduced by the time during which the generation of the host authentication code HA_CODE overlaps the generation of the device authentication code.

Figure 11:
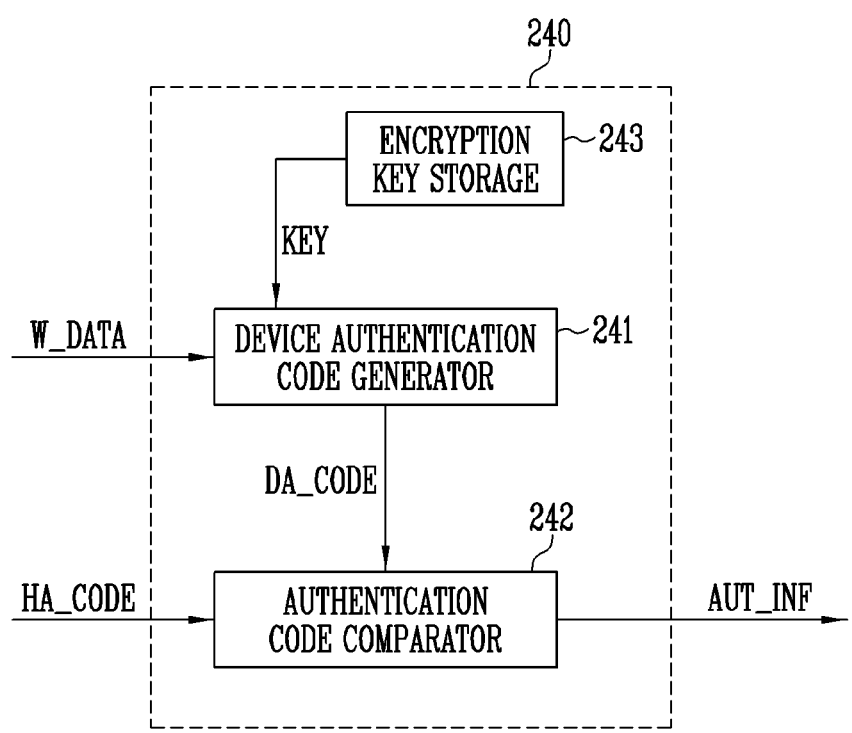
FIG. 11 is a diagram illustrating a data verification component, such as that shown in FIG. 10.

FIG. 11 is a diagram illustrating the data verification component 240 shown in FIG. 10.

Referring to FIG. 11, the data verification component 240 may include a device authentication code generator 241 and an authentication code comparator 242. The data verification component 240 may further include an encryption key storage 243.

The device authentication code generator 241 may generate the device authentication code DA_CODE based on the write data W_DATA received from the host and a shared key KEY received from the encryption key storage 243. The device authentication code generator 241 may generate the device authentication code DA_CODE by using a message authentication code (MAC) algorithm. The device authentication code generator 241 may provide the authentication code comparator 242 with the device authentication code DA_CODE.

The authentication code comparator 242 may generate the authentication information AUT_INF indicating integrity of the write data W_DATA based on the comparison between the host authentication code HA_CODE received from the host and the device authentication code DA_CODE. The authentication code comparator 242 may determine whether the write data W_DATA has integrity according to whether the host authentication code HA_CODE is the same as the device authentication code DA_CODE.

The encryption key storage 243 may store the shared key KEY between the host and the storage device. The shared key KEY may be used for generating an authentication code. The shared key KEY may be previously stored in the encryption key storage 243. The shared key KEY may be changed in response to a request of the host.

Figure 12:
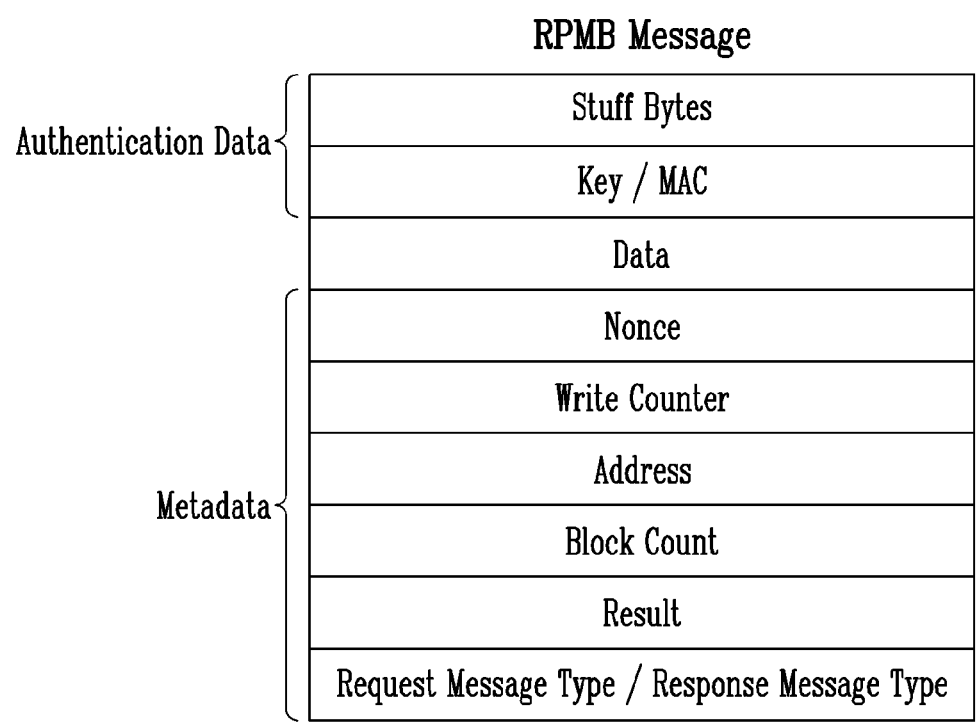
FIG. 12 is a diagram illustrating read information (also known as RPMB message), such as that shown in FIG. 7.

FIG. 12 is a diagram illustrating read information (also known as Replay Protected Memory Block (RPMB) message), such as that shown in FIG. 7.

The Stuff Bytes may include padding data or dummy data. The Stuff Bytes may have a length dependent on a length of the MAC. For example, the Stuff Bytes may have a length of 223 bytes minus the length of an authentication key. The message authentication code (MAC) may include a result calculated by host 300 using a pre-stored authentication key and metadata. That is, the MAC may include an authentication code calculated using an authentication method such as a hash-based message authentication code (HMAC SHA-256). The MAC may have a length dependent on authentication method. For example, The MAC may have a length of 256 bits (32 bytes). The authentication key used to generate the MAC may have a length of 256 bits.

The RPMB Message may include a RPMB target. The RPMB target may include information indicating which RPMB this Request message/Response message is targeted for. The RPMB target may include a decimal value indicating which RMPB is targeted for. An error of invalid field may be aroused when the value in the RPMB target may not matched with a value in the controller. For example, when the value in the RPMB target may not equal to a value in NVMe Security Specific Field(NSSF) in the command, then the controller may return an error of invalid field for the command.

In an embodiment, the Data may be written or read by 512 Bytes*Sector Count in one RPMB message data frame under a communication method of host interface such as the NVMe protocol, when the Data whose length is greater than 512 byte.

In an embodiment, the RPMB message may be composed of one or more RPMB message data frames under a communication method of host interface such as the UFS protocol, each of which includes: Request Message Type=0003h, Block Count, Address, Write Counter, Data and MAC.

In each data frame, the Nonce contains a copy of the received nonce, the address is the start address of the full access (not address of the individual logical block) and the block count is the total count of the blocks (not the sequence number of blocks).

The metadata may include nonce, write counter, address, block count, result and request message type/response message type.

The nonce may include a random number generated by the host 300. The nonce provided by the host 300 may be copied to a response that the memory controller 200 will provide to the host 300.

The write counter may include the number of times a write operation is successfully performed on the RPMB (also known as write protection area 110). The write counter may include total amount of successfully authenticated data write requests.

The address may be a logical address to store data in the RPMB or a logical address to be read from the RPMB.

The block count may include the number of logical blocks for which an RPMB write operation or an RPMB read operation is requested. The block count may be the number of logical blocks in units of 256 bytes.

The result may include a result of performing an RPMB write operation or an RPMB read operation.

The request message type/response message type may indicate whether an operation of the RPMB message is an RPMB write operation or an RPMB read operation.

The RPMB Message may include Data to be written by the RPMB write operation. The RPMB message may comprise of one or multiple RPMB message data frames and the number of the RPMB message data frame may be dependent on a communication method of host interface. For example, The RPMB message delivered from the host to the device may be composed of one or more RPMB message data frame, each of which includes Request Message Type, Block Count, Address Write Counter, Data and MAC. For example, The RPMB message delivered from the host to the device may be composed of one RPMB message data frame including Data whose length is greater than 512 byte or may be dependent on the block count.

The RPMB Message may include Data to be read by the RPMB read operation. The RPMB message may comprise of one or multiple RPMB message data frames and the number of the RPMB message data frame may be dependent on a communication method of host interface. For example, The RPMB message delivered from the device to the host may be composed of one or more RPMB message data frame. The MAC may be included in the last RPMB message data frames, the MAC field may be zero in previous data frames. In each data frame, the nonce may contain a copy of the received nonce, the address may be the start address of the full access and the block count may be the total count of the blocks. For example, The RPMB message delivered from the device to the host may be composed of one RPMB message data frame including Data whose length is greater than 512 byte or may be dependent on the block count.

Figure 13:
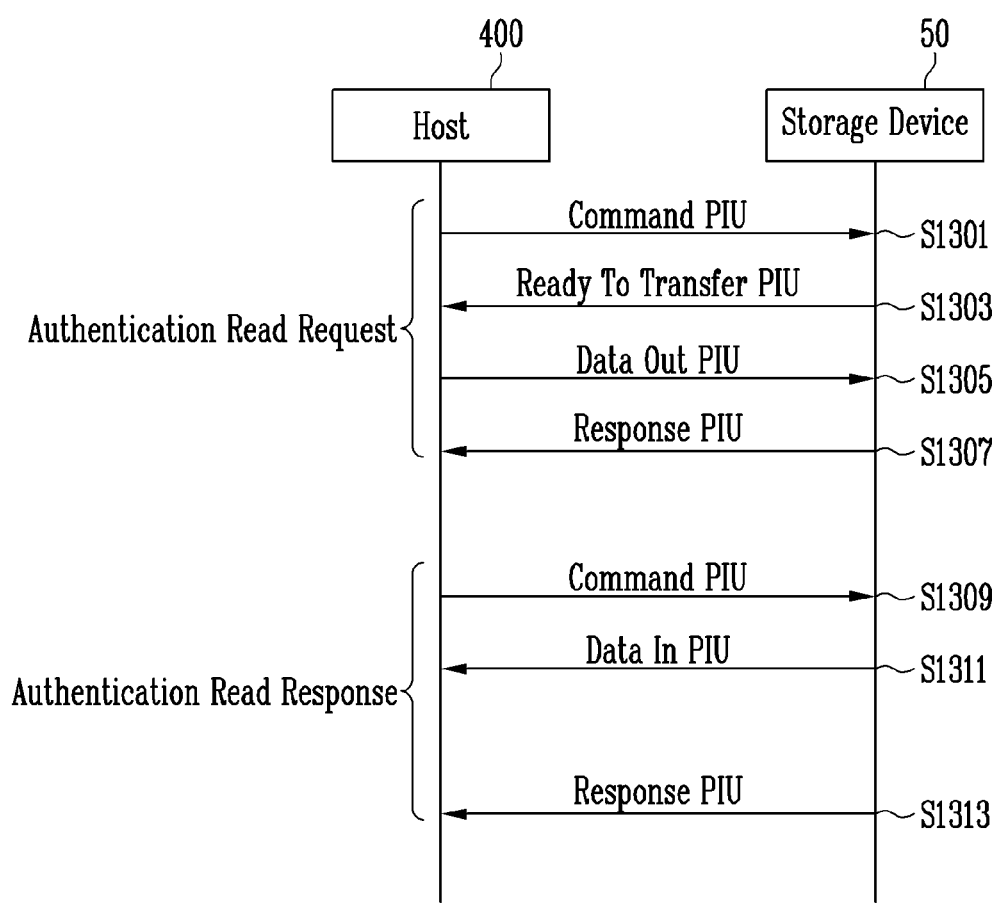
FIG. 13 is a diagram illustrating a security read operation (also known as an RPMB read operation), such as that shown in FIG. 2.

FIG. 13 is a diagram illustrating a security read operation (also known as an RPMB read operation), such as that shown in FIG. 2.

Referring to FIG. 13, the RPMB read operation that reads the data stored in the RPMB involves two handshakes between the host 300 and the storage device 50. Specifically, the RPMB read operation includes an authentication read request and an authentication read response.

The authentication read request may be performed through steps S1301 to S1307, and the authentication read response may be performed through steps S1309 to S1313.

The authentication read request may be a request instructing to read data stored in the RPMB. The authentication read response may be a response providing read data.

In an embodiment, the steps S201 and S203 in FIG. 2 may include the steps S1301 to S1307. The steps S205 and S207 in FIG. 2 may include the steps S1309 to S1313.

In step S1301, the host 300 may provide a command protocol unit (Command PIU) to the storage device 50. The Command PIU provided in step S1301 may include an RPMB message. The storage device 50 may perform an authentication operation for the RPMB using the message authentication code (MAC) and metadata included in the RPMB message.

In step S1303, the storage device 50 may provide a ready to transfer protocol unit (Ready To Transfer PIU) to the host 300. The Ready To Transfer PIU may be a protocol unit provided when the storage device 50 is ready to receive data to be provided by the host 300. In an embodiment, the Ready To Transfer PIU may be a protocol unit that provides a message indicating that it is ready to receive a data out protocol unit (Data Out PIU).

In step S1305, the host 300 may provide the Data Out PIU to the storage device 50.

In step S1307, the storage device 50 may provide a response protocol unit (Response PIU) to the host 300. The Response PIU provided by the storage device 50 may include a result of normally receiving a request for performing an RPMB read operation.

In step S1309, the host 300 may provide a command protocol unit (Command PIU) to the storage device 50. The Command PIU provided in step S1309 may include an RPMB message. In an embodiment, the RPMB message included in the Command PIU in step S1309 may include a message indicating that the Command PIU provided by the host 300 requests the read data.

In step S1311, the storage device 50 may provide a data in protocol unit (Data In PIU) to the host 300. The Data In PIU provided by the storage device 50 may include a plurality of data segments. The plurality of data segments may be the read data.

In step S1313, the storage device 50 may provide a response protocol unit (Response PIU) to the host 300.

FIG. 14A and FIG. 14B are diagrams illustrating RPMB messages provided during the RPMB read operation shown in FIG. 13.

FIG. 14A shows the RPMB message provided by the host 300 to the storage device 50 in the authentication read request.

Referring to FIG. 14A, the RPMB message of the authentication read request may be included in the command protocol unit (Command PIU) provided to the storage device 50 from the host 300 in step S1301 in FIG. 13.

Specifically, the RPMB message of the authentication read request may include a nonce provided by the host 300, an address to be read, a block count to be read, and a message indicating that the Command PIU provided by the host 300 to the storage device 50 in step S1301 is the authentication read request.

FIG. 14B shows the RPMB message provided by the storage device 50 to the host 300 in the Result Read Response.

Referring to FIG. 14B, the RPMB message of the Result Read Response may be included in a response protocol unit (Response PIU) provided to the host 300 from the storage device 50 in step S1309 in FIG. 13.

The RPMB message of the authentication read response may include the nonce of RPMB message of the authentication read request in FIG. 14A, an address that is read, a block count that is read, a result code. Plus, the RPMB message of the authentication read response may include a message indicating that the Response PIU provided to the host 300 from the storage device 50 in step S1309 is the result read response.

In an embodiment, the RPMB message may further include a message authentication code (MAC) generated by the storage device 50.

Figure 15:
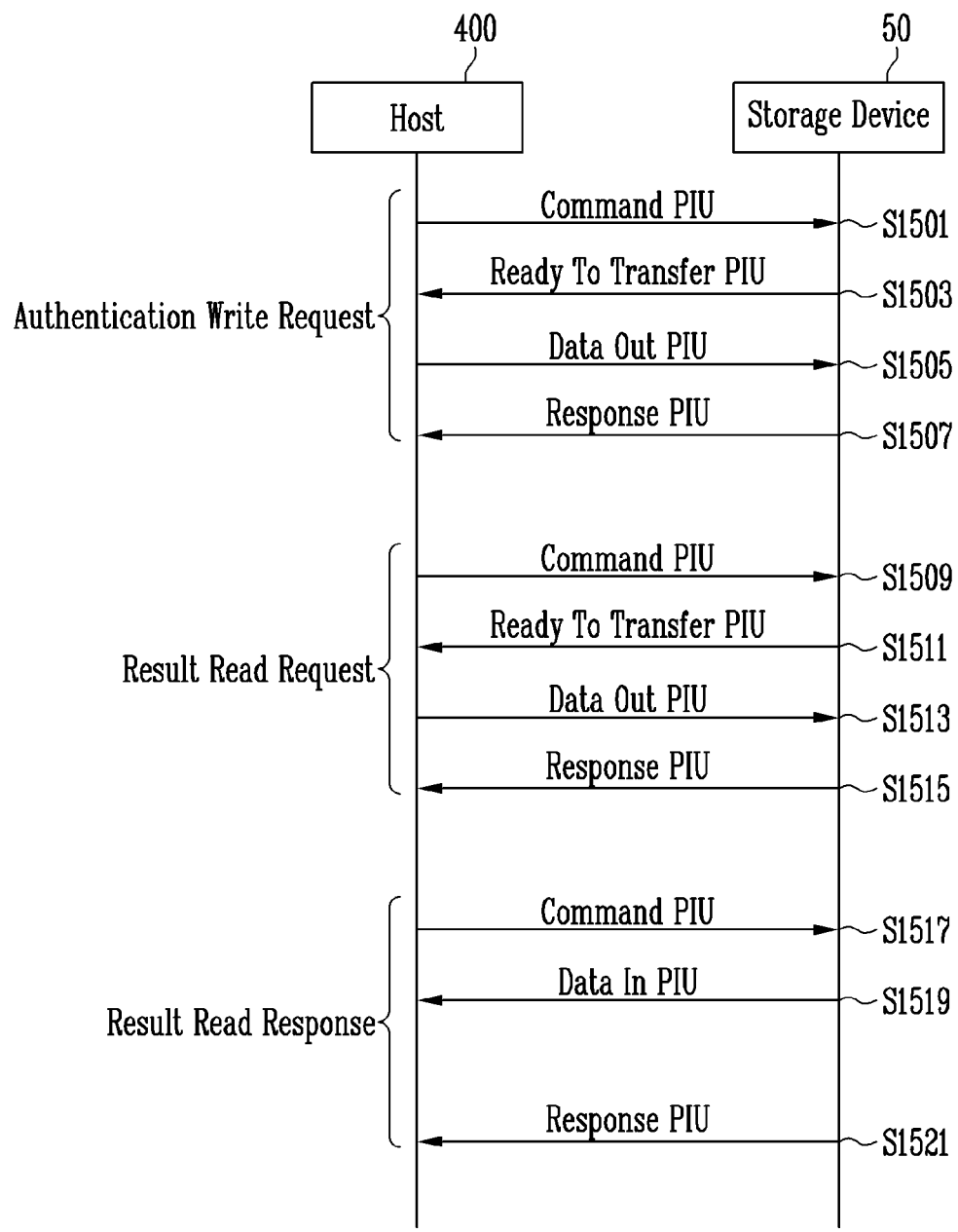
FIG. 15 is a diagram illustrating a security write (also known as an RPMB write operation), such as that shown in FIG. 8.

FIG. 15 is a diagram illustrating a security write (also known as an RPMB write operation), such as that shown in FIG. 8.

Referring to FIG. 15, The RPMB write operation that stores data in RPMB involves a combination of three commands (protocol handshake) between host 300 and storage device 50.

Specifically, the RPMB write operation may include Authentication Write Request, Result Read Request and Result Read Response.

The Authentication Write Request is performed through the steps S1501 to S1507. The Result Read Request is performed through the steps S1509 to S1515. The Result Read Response is performed through steps the S1517 to S1521.

In an embodiment, the steps S803 and S805 in FIG. 8 may include the steps S1501 to S1507. The steps S807 and S809 in FIG. 8 may include the steps S1509 to S1515. The steps S811 and S813 in FIG. 8 may include the steps S1517 to S1521.

The authentication write request may be a request that stores data in the RPMB and includes data to be stored. The result read request may be a request for transmitting a command for requesting a value stored in a result register in which the result of the RPMB write operation is stored. The result read response may be a response providing the value of the result register.

In step S1501, the host 300 may provide a command protocol unit (Command PIU) to the storage device 50. The Command PIU provided in step S1501 may include an RPMB message. The storage device 50 may perform an authentication operation for the RPMB using the message authentication code (MAC) and metadata included in the RPMB message.

In step S1503, the storage device 50 may provide a transfer preparation protocol unit (Ready To Transfer PIU) to the host 300. The Ready To Transfer PIU may be a protocol unit provided when the storage device 50 is ready to receive data from the host 300. In an embodiment, the Ready To Transfer PIU may be a protocol unit that provides a message indicating that the storage device 50 is ready to receive a data out protocol unit (Data Out PIU) from the host 300.

In step S1505, the host 300 may provide the Data Out PIU to the storage device 50. The Data Out PIU may include a plurality of data segments including data to be stored in the RPM B.

In step S1507, the storage device 50 may provide a response protocol unit (Response PIU) to the host 300. The Response PIU may include a result of performing an RPMB write operation.

In step S1509, the host 300 may provide a command protocol unit (Command PIU) to the storage device 50. The Command PIU may include an RPMB message. In an embodiment, the RPMB message included in the Command PIU may include a message that the Command PIU provided by host 300 is a command requesting a value stored in the result register.

In step S1511, the storage device 50 may provide a ready to transfer protocol unit (Ready To Transfer PIU) to the host 300. The Ready To Transfer PIU may be a protocol unit provided when the storage device 50 is ready to receive data to be provided by the host 300. In an embodiment, the Ready To Transfer PIU may be a protocol unit that provides a message indicating that the storage device 50 is ready to receive a data out protocol unit (Data Out PIU) from the host 300.

In step S1513, the host 300 may provide the Data Out PIU to the storage device 50.

In step S1515, the storage device 50 may provide a response protocol unit (Response PIU) to the host 300. In step S1515, the Response PIU may include information indicating that the message of the command requesting the value stored in the result register received in step S1509 has been successfully received.

In step S1517, the host 300 may provide a command protocol unit (Command PIU) to the storage device 50. The Command PIU may be a command requesting data from the storage device 50.

In step S1519, the storage device 50 may provide a data in protocol unit (Data In PIU) to the host 300.

In step S1521, the storage device 50 may provide a response protocol unit (Response PIU) to the host 300. The Response PIU may include an RPMB message including the value stored in the result register.

FIG. 16A to FIG. 16C are diagrams illustrating RPMB messages provided during the RPMB write operation shown in FIG. 15. FIG. 16A shows an RPMB message provided by a host 300 to a storage device 50 in an authentication write request.

Referring to FIG. 16A, the RPMB message of the authentication write request may be included in a command protocol unit provided by the host 300 to the storage device 50 in step S1501 described in FIG. 15.

Specifically, the RPMB message of the authentication write request may include a message authentication code (MAC) calculated by the host 300, a current write counter value, an address where the data is to be stored in the RPMB, a logical block count, and a message indicating that the command protocol unit is the authentication write request.

FIG. 16B shows an RPMB message provided by a host 300 to storage device 50 in a result read request.

Referring to FIG. 16B, the RPMB message of the result read request may be included in a command protocol unit provided by the host 300 to the storage device 50 in step S1509 described in FIG. 15.

The RPMB message of the result read request includes only a message that the command protocol unit is a result read request, and the remaining fields may be 0.

FIG. 16C shows an RPMB message provided by the storage device 50 to the host 300 in the result read response.

Referring FIG. 16C, the RPMB message of the result read response may be included in a response protocol unit provided by the storage device 50 to the host 300 in step S1521 described in FIG. 15.

The RPMB message of the result read response may include a message authentication code (MAC) calculated by a storage device. The MAC may be an authentication code calculated by using the authentication key stored in the storage device and metadata included in the RPMB message of the result read response.

The RPMB message of the result read response may include an updated write counter value having an increased value than the write counter value of the RPMB message of FIG. 16A.

In an embodiment, the RPMB message of the result read response may further include a message indicating that the command protocol unit is the result read response.

Figure 17:
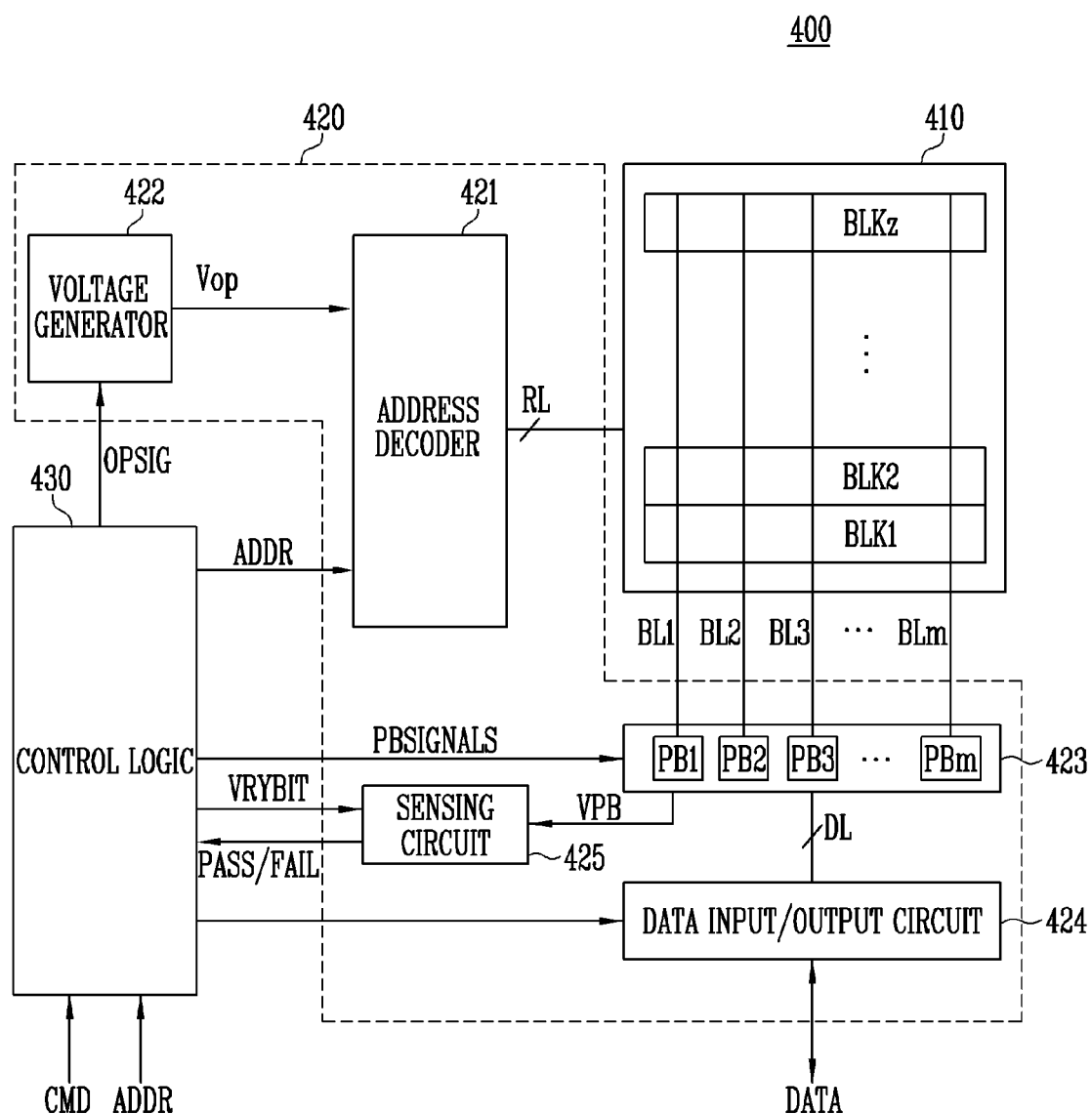
FIG. 17 is a diagram illustrating a structure of a memory device, such as that shown in FIG. 1.

FIG. 17 is a diagram illustrating a structure of a memory device 400, which may the same as or similar to the memory device 100 shown in FIG. 1.

Referring to FIG. 17, the memory device 400 may include a memory cell array 410, a peripheral circuit 420, and control logic 430. The peripheral circuit 420 may include an address decoder 421, a voltage generator 422, a read and write circuit 423, a data input/output circuit 424, and a sensing circuit 425.

The memory cell array 410 may include a plurality of memory blocks BLK1 to BLKz, which may be coupled to the address decoder 421 through row lines RL. The plurality of memory blocks BLK1 to BLKz may be coupled to the read and write circuit 423 through bit lines BL1 to BLm. Each of the plurality of memory blocks BLK1 to BLKz may include a plurality of memory cells. According to an embodiment, the plurality of memory cells may be nonvolatile memory cells. Among the plurality of memory cells, memory cells coupled to the same word line may be defined as one physical page. In other words, the memory cell array 410 may include a plurality of physical pages. According to an embodiment of the present disclosure, each of the plurality of memory blocks BLK1 to BLKz in the memory cell array 410 may include a plurality of dummy cells. At least one dummy cell may be coupled in series between a drain select transistor and the memory cells and between a source select transistor and the memory cells.

The memory cells of the memory device 400 may include a Single-Level Cell (SLC) storing one bit of data, a Multi-Level Cell (MLC) storing two bits of data, a Triple-Level Cell (TLC) storing three bits of data, and/or a Quad-Level Cell (QLC) storing four bits of data.

The peripheral circuit 420 may drive the memory cell array 410. For example, the peripheral circuit 420 may drive the memory cell array 410 to perform a program operation, a read operation, and an erase operation.

The address decoder 421 may be coupled to the memory cell array 410 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 421 may be configured to operate in response to control of the control logic 430. The address decoder 421 may receive an address ADDR from the control logic 430.

The address decoder 421 may be configured to decode a block address of the received address ADDR. The address decoder 421 may select at least one memory block among the memory blocks BLK1 to BLKz according to the decoded block address. The address decoder 421 may be configured to decode a row address of the received address ADDR. The address decoder 421 may select at least one word line among the word lines of the memory block selected according to the decoded row address. The address decoder 421 may apply an operating voltage Vop supplied from the voltage generator 422 to the selected word line.

During a program operation, the address decoder 421 may apply a program voltage to the selected word line and a pass voltage lower than the program voltage to unselected word lines. During a program verify operation, the address decoder 421 may apply a verify voltage to the selected word line and a verify pass voltage higher than the verify voltage to the unselected word lines.

During a read operation, the address decoder 421 may apply a read voltage to the selected word line and a read pass voltage higher than the read voltage to the unselected word lines.

According to an embodiment of the present disclosure, the memory device 400 may perform an erase operation on each memory block. During the erase operation, the address ADDR input to the memory device 400 may include the block address. The address decoder 421 may decode the block address and select at least one memory block in response to the decoded block address. During the erase operation, the address decoder 421 may apply a ground voltage to word lines coupled to the selected memory block.

According to an embodiment of the present disclosure, the address decoder 421 may be configured to decode a column address of the transmitted address ADDR. The decoded column address may be transmitted to the read and write circuit 423. For example, the address decoder 421 may include components such as a row decoder, a column decoder and an address buffer.

The voltage generator 422 may be configured to generate the plurality of operating voltages Vop by using an external power voltage supplied to the memory device 400. The voltage generator 422 may operate in response to control of the control logic 430.

According to an embodiment, the voltage generator 422 may generate an internal power voltage by regulating an external power voltage. The internal power voltage generated by the voltage generator 422 may be used as an operating voltage for the memory device 400.

According to an embodiment, the voltage generator 422 may generate the plurality of voltages Vop by using the external power voltage or the internal power voltage. The voltage generator 422 may be configured to generate various voltages required by the memory device 400. For example, the voltage generator 422 may generate a plurality of erase voltages, a plurality of program voltages, a plurality of pass voltages, a plurality of selected read voltages, and a plurality of unselected read voltages.

The voltage generator 422 may include a plurality of pumping capacitors receiving the internal power voltage to generate the plurality of operating voltages Vop having various voltage levels, and may generate the plurality of operating voltages Vop by selectively activating the plurality of pumping capacitors in response to control of the control logic 430.

The plurality of generated operating voltages Vop may be supplied to the memory cell array 410 by the address decoder 421.

The read and write circuit 423 may include first to mth page buffers PB1 to PBm, which may be coupled to the memory cell array 410 through the first to mth bit lines BL1 to BLm, respectively. The buffers PB1 to PBm may operate in response to control of the control logic 430.

The page buffers PB1 to PBm may communicate data DATA with the data input/output circuit 424. During a program operation, the page buffers PB1 to PBm may receive the data DATA to be stored through the data input/output circuit 424 and data lines DL.

During a program operation, when a program voltage is applied to the selected word line, the page buffers PB1 to PBm may transfer the DATA to be stored, which is received through the data input/output circuit 424, to the selected memory cells through the bit lines BL1 to BLm. The memory cells of a selected page may be programmed according to the transmitted data DATA. A memory cell coupled to a bit line to which a program permission voltage (for example, a ground voltage) is applied may have an increased threshold voltage. A threshold voltage of a memory cell coupled to a bit line to which a program inhibition voltage (for example, a power voltage) is applied may be maintained. During a program verify operation, the page buffers PB1 to PBm may read the data DATA stored in the memory cells through the bit lines BL1 to BLm from the selected memory cells.

During a read operation, the read and write circuit 423 may read the data DATA from the memory cells of the selected page through the bit lines BL1 to BLm and may store the read data DATA in the page buffers PB1 to PBm.

During an erase operation, the read and write circuit 423 may float the bit lines BL1 to BLm. According to an embodiment, the read and write circuit 423 may include a column select circuit.

The data input/output circuit 424 may be coupled to the page buffers PB1 to PBm through the data lines DL. The data input/output circuit 424 may operate in response to control of the control logic 430.

The data input/output circuit 424 may include a plurality of input/output buffers (not illustrated) receiving the input data DATA. During a program operation, the data input/output circuit 424 may receive the data DATA to be stored from an external controller (not illustrated). During a read operation, the data input/output circuit 424 may output the data DATA, which is transmitted from the page buffers PB1 to PBm in the read and write circuit 423, to the external controller.

During a read operation or a verify operation, the sensing circuit 425 may generate a reference current in response to an allowable bit VRYBIT signal generated by the control logic 430 and may output a pass signal or a fail signal to the control logic 430 by comparing a sensing voltage VPB received from the read and write circuit 423 with a reference voltage generated by the reference current.

The control logic 430 may be coupled to the address decoder 421, the voltage generator 422, the read and write circuit 423, the data input/output circuit 424, and the sensing circuit 425. The control logic 430 may be configured to control general operation of the memory device 400. The control logic 430 may operate in response to a command CMD transmitted from an external device.

The control logic 430 may control the peripheral circuit 420 by generating various signals in response to the command CMD and the address ADDR. For example, the control logic 430 may output an operation signal OPSIG, the address ADDR, a read and write circuit control signal PBSIGNALS, and the allowable bit VRYBIT in response to the command CMD and the address ADDR. The control logic 430 may output the operation signal OPSIG to the voltage generator 422, output the address ADDR to the address decoder 421, output the read and write control signal PBSIGNALS to the read and write circuit 423, and may output the allowable bit VRYBIT to the sensing circuit 425. In addition, the control logic 430 may determine whether a verify operation has passed or failed in response to a pass or fail signal PASS/FAIL output by the sensing circuit 425.

Figure 18:
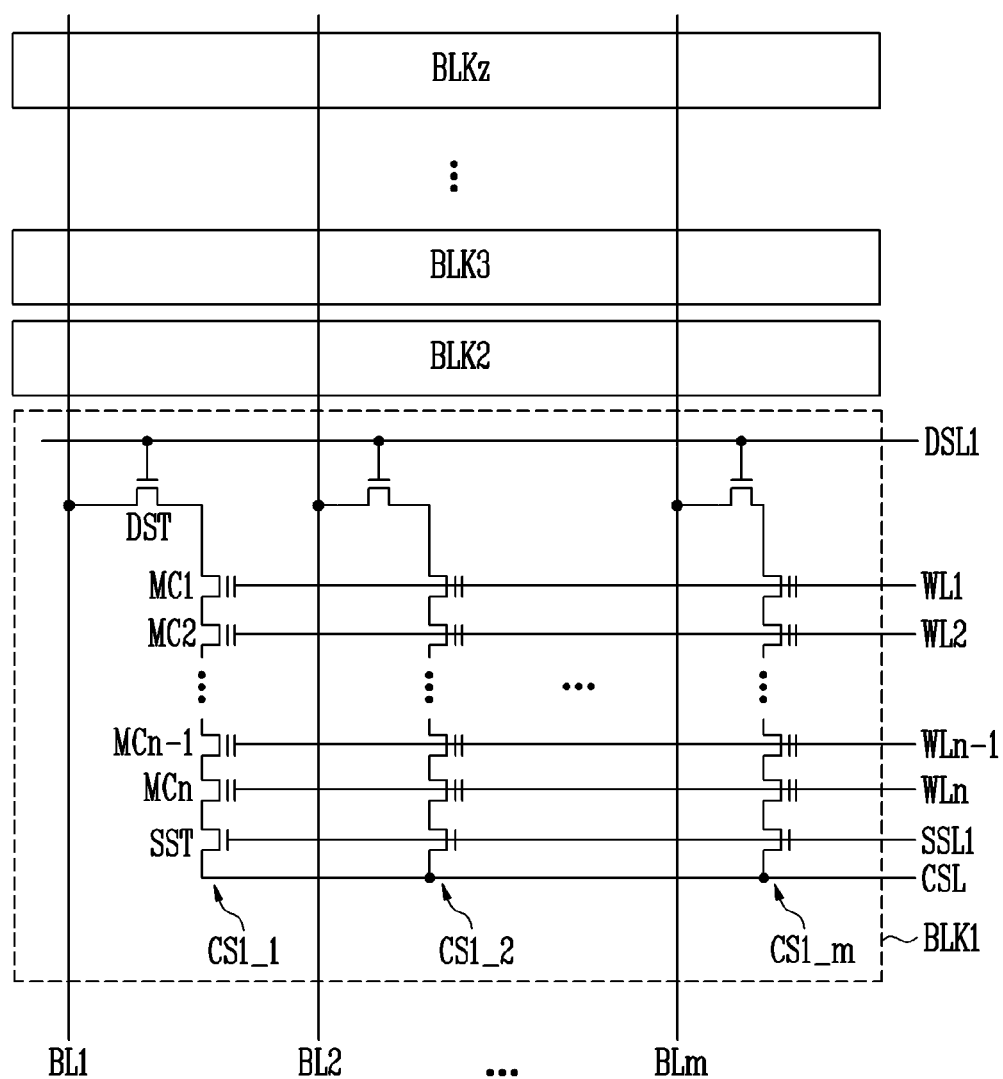
FIG. 18 is a diagram illustrating a memory cell array, such as that shown in FIG. 17.

FIG. 18 is a diagram illustrating the memory cell array 410 shown in FIG. 17.

Referring to FIG. 18, the first to zth memory blocks BLK1 to BLKz may be coupled to the first to mth bit lines BL1 to BLm in common. In FIG. 18, by way of example, components included in the first memory block BLK1, among the plurality of memory blocks BLK1 to BLKz, are illustrated. However, it is understood that each of the remaining memory blocks BLK2 to BLKz may be configured in substantially the same manner as the first memory block BLK1.

The memory block BLK1 may include a plurality of cell strings CS1_1 to CS1_$m$, where m is a positive integer. The cell strings CS1_1 to CS1_$m$ may be coupled to bit lines BL1 to BLm, respectively. Each of the cell strings CS1_1 to CS1_$m$ may include a drain select transistor DST, a plurality of memory cells MC1 to MCn coupled in series, and a source select transistor SST, where n is a positive integer.

A gate terminal of the drain select transistor DST included in each of the cell strings CS1_1 to CS1_$m$ may be coupled to a drain select line DSL1. Gate terminals of the memory cells MC1 to MCn included in each of the cell strings CS1_1 to CS1_$m$ may be coupled to word lines WL1 to WLn, respectively. A gate terminal of the source select transistor SST included in each of the cell strings CS1_1 to CS1_$m$ may be coupled to a source select line SSL1.

By way of example, a structure of the first cell string CS1_1, among the plurality of cell strings CS1_1 to CS1_$m$, is described. However, it is understood that each of the remaining cell strings CS1_2 to CS1_$m$ may be configured in substantially the same manner as the first cell string CS1_1.

A drain terminal of the drain select transistor DST included in the first cell string CS1_1 may be coupled to the first bit line BL1. A source terminal of the drain select transistor DST included in the first cell string CS1_1 may be coupled to a drain terminal of the first memory cell MC1 included in the first cell string CS1_1. The memory cells MC1 to MCn may be coupled to each other in series. A drain terminal of the source select transistor SST included in the first cell string CS1_1 may be coupled to a source terminal of the nth memory cell MCn in the first cell string CS1_1. A source terminal of the source select transistor SST included in the first cell string CS1_1 may be coupled to a common source line CSL. According to an embodiment, the common source line CSL may be coupled to the memory blocks BLK1 to BLKz in common.

The drain select line DSL1, the word lines WL1 to WLn, and the source select line SSL1 may be included in the row lines RL shown in FIG. 17. The drain select line DSL1, the first to nth word lines WL1 to WLn, and the source select line SSL1 may be controlled by the address decoder 421. The common source line CSL may be controlled by the control logic 430. The bit lines BL1 to BLm may be controlled by the read and write circuit 423.

Figure 19:
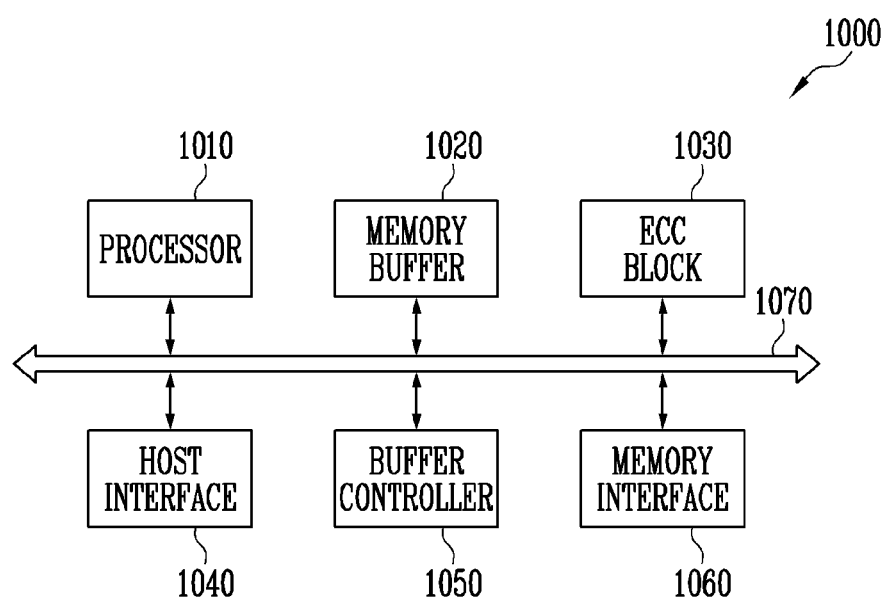
FIG. 19 is a diagram illustrating another embodiment of a memory controller.

FIG. 19 is a diagram illustrating another embodiment of a memory controller shown in FIG. 1.

Referring to FIG. 19, a memory controller 1000 may be coupled to a host and a memory device. The memory controller 1000 may access the memory device in response to a request from the host. For example, the memory controller 1000 may control write, read, erase, and background operations of the memory device. The memory controller 1000 may provide an interface between the memory device and the host. The memory controller 1000 may be configured to drive firmware for controlling the memory device.

The memory controller 1000 may include a processor 1010, a memory buffer 1020, an error correction code (ECC) block 1030, a host interface 1040, a buffer controller 1050, a memory interface 1060, and a bus 1070.

The bus 1070 may provide a channel between components of the memory controller 1000.

The processor 1010 may control overall operation of the memory controller 1000 and may perform a logical operation. The processor 1010 may communicate with an external host through the host interface 1040 and communicate with the memory device through the memory interface 1060. Further, the processor 1010 may communicate with the memory buffer 1020 through the buffer controller 1050. The processor 1010 may control operations of a storage device by using the memory buffer 1020 as operational memory, cache memory or buffer memory.

The processor 1010 may perform the function of a flash translation layer (FTL). The processor 1010 may translate a logical block address (LBA), which is provided by the host, to a physical block address (PBA) through the FTL. The FTL may receive the LBA and translate the LBA to the PBA by using a mapping table. There may be various address mapping methods for the FTL depending on a mapping unit. Typical address mapping methods include a page mapping method, a block mapping method and a hybrid mapping method.

The processor 1010 may be configured to randomize data received from the host. For example, the processor 1010 may randomize the data received from the host using a randomizing seed. The randomized data may be provided to the memory device as data to be stored and may be programmed into a memory cell array.

The processor 1010 may be configured to derandomize data received from the memory device during a read operation. For example, the processor 1010 may derandomize the data received from the memory device using a derandomizing seed. The derandomized data may be output to the host.

According to an embodiment, the processor 1010 may run software or firmware to perform randomizing and derandomizing operations.

The memory buffer 1020 may serve as operational memory, cache memory, or buffer memory of the processor 1010. The memory buffer 1020 may store codes and commands executed by the processor 1010. The memory buffer 1020 may store data processed by the processor 1010. The memory buffer 1020 may include Static RAM (SRAM) or Dynamic RAM (DRAM).

The ECC block 1030 may perform error correction. The ECC block 1030 may perform ECC encoding based on data to be written to the memory device through the memory interface 1060. The ECC-encoded data may be transmitted to the memory device through the memory interface 1060. The ECC block 1030 may perform ECC decoding on data received from the memory device through the memory interface 1060. For example, the ECC block 1030 may be included as a component of, and disposed in, the memory interface 1060.

The host interface 1040 may be configured to communicate with the external host under the control of the processor 1010. The host interface 1040 may perform communication using at least one of various communication methods such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer controller 1050 may be configured to control the memory buffer 1020 under the control of the processor 1010.

The memory interface 1060 may be configured to communicate with the memory device under the control of the processor 1010. The memory interface 1060 may exchange commands, addresses, and data with the memory device through channels.

In an embodiment, the memory controller 1000 does not include the memory buffer 1020 and the buffer controller 1050. Instead, one or both of these components may be provided separately, and/or the functionality of one or both such components may be distributed within the memory controller 1000.

For example, the processor 1010 may control the operations of the memory controller 1000 using codes. The processor 1010 may load codes from a nonvolatile memory device provided in the memory controller 1000 (for example, Read Only Memory (ROM)). In another example, the processor 1010 may load codes from the memory device through the memory interface 1060.

For example, the bus 1070 of the memory controller 1000 may be divided into a control bus and a data bus. The data bus may be configured to transmit data in the memory controller 1000, and the control bus may be configured to transmit control information such as commands and addresses in the memory controller 1000. The data bus and the control bus may be isolated from each other so as not to interfere with, nor influence, each other. The data bus may be coupled to the host interface 1040, the buffer controller 1050, the ECC block 1030, and the memory interface 1060. The control bus may be coupled to the host interface 1040, the processor 1010, the buffer controller 1050, the memory buffer 1020, and the memory interface 1060.

According to an embodiment, the authenticated read controller 210 shown in FIG. 5 may be included in the processor 1010 and the buffer 220 may be included in the memory buffer 1020. According to an embodiment, the authenticated write controller 230 and the data verification component 240 shown in FIG. 10 may be included in the processor 1010.

Figure 20:
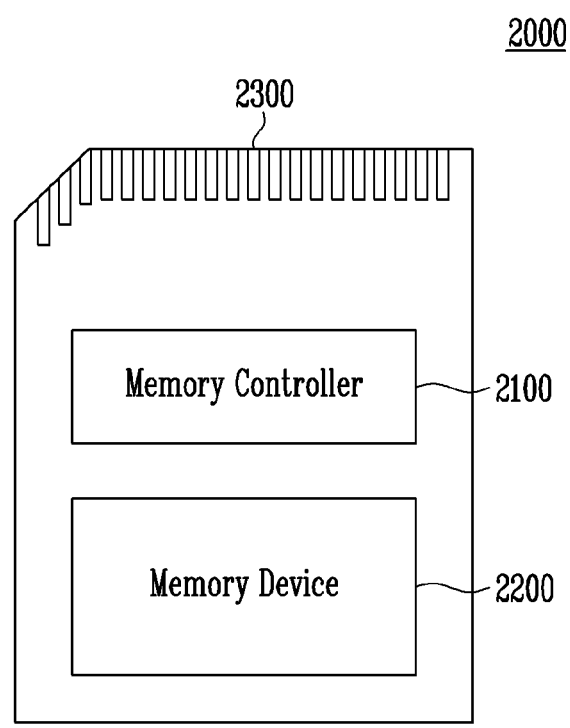
FIG. 20 is a block diagram illustrating a memory card system to which a storage device is applied according to an embodiment of the present disclosure.

FIG. 20 is a block diagram illustrating a memory card system 2000 to which a storage device is applied according to an embodiment of the present disclosure.

Referring to FIG. 20, the memory card system 2000 may include a memory controller 2100, a memory device 2200, and a connector 2300.

The memory controller 2100 may be coupled to the memory device 2200. The memory controller 2100 may access the memory device 2200. For example, the memory controller 2100 may be configured to control read, write, erase and background operations of the memory device 2200. The memory controller 2100 may be configured to provide an interface between the memory device 2200 and the host. The memory controller 2100 may be configured to drive firmware for controlling the memory device 2200. The memory controller 2100 may be configured in the same manner as the memory controller 200 described above with reference to FIG. 1.

For example, the memory controller 2100 may include components, such as a random access memory (RAM), a processing unit, a host interface, a memory interface, and an ECC block.

The memory controller 2100 may communicate with an external device through the connector 2300. The memory controller 2100 may communicate with the external device (for example, a host) based on a specific communication protocol. For example, the memory controller 2100 may communicate with the external device through at least one of various communication protocols such as a Universal Serial Bus (USB), a multimedia card (MMC), an embedded MMC (eMMC), a peripheral component interconnection (PCI), PCI-express (PCI-e or PCIe), Advanced Technology Attachment (ATA), Serial-ATA (SATA), Parallel-ATA (PATA), a small computer system interface (SCSI), an enhanced small disk interface (ESDI), Integrated Drive Electronics (IDE), Firewire, Universal Flash Storage (UFS), WiFi, Bluetooth, and/or nonvolatile memory express (NVMe). For example, the connector 2300 may be defined by at least one of the above-described various communication protocols.

For example, the memory device 2200 may be implemented as any of various nonvolatile memory devices, such as Electrically Erasable and Programmable ROM (EEPROM), NAND flash memory, NOR flash memory, Phase-change RAM (PRAM), Resistive RAM (ReRAM), Ferroelectric RAM (FRAM), and/or Spin-Transfer Torque Magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device and form a memory card, such as a personal computer memory card international association (PCMCIA), a compact flash card (CF), a smart media card (e.g., SM or SMC), a memory stick, a multimedia card (e.g., MMC, RS-MMC, MMCmicro, or eMMC), a secure digital (SD) card (e.g., SD, miniSD, microSD, or SDHC), and/or universal flash storage (UFS).

Figure 21:
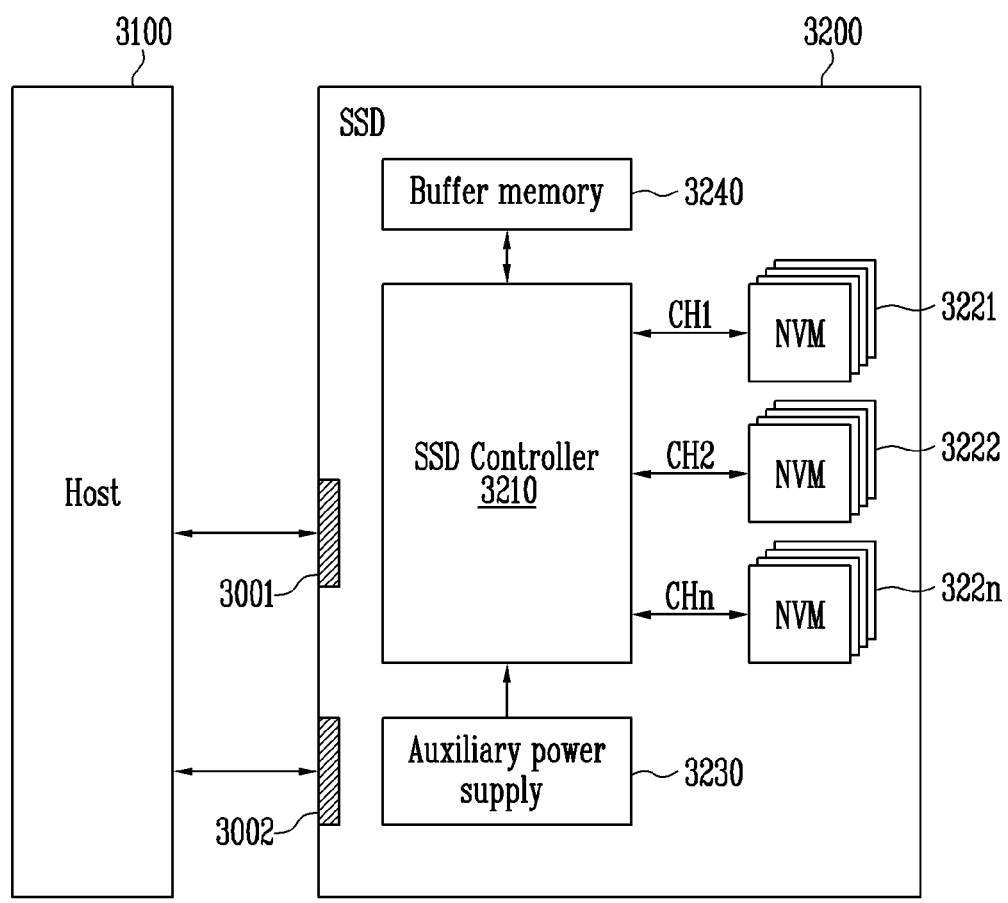
FIG. 21 is a block diagram illustrating a Solid State Drive (SSD) system to which a storage device is applied according to an embodiment of the present disclosure.

FIG. 21 is a block diagram illustrating a solid state drive (SSD) system 3000 to which a storage device is applied according to an embodiment of the present disclosure.

Referring to FIG. 21, the SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of flash memory 3221 to 322$n$, an auxiliary power supply 3230, and buffer memory 3240.

According to an embodiment, the SSD controller 3210 may perform the function of the memory controller 200 described above with reference to FIG. 1.

The SSD controller 3210 may control the plurality of flash memory 3221 to 322$n$ in response to the signals received from the host 3100. For example, the signals may be based on the interfaces of the host 3100 and the SSD 3200. For example, the signals may be defined by at least one of various interfaces such as a Universal Serial Bus (USB), a multimedia card (MMC), an embedded MMC (eMMC), a peripheral component interconnection (PCI), PCI-express (PCI-e or PCIe), Advanced Technology Attachment (ATA), Serial-ATA (SATA), Parallel-ATA (PATA), a small computer system interface (SCSI), an enhanced small disk interface (ESDI), Integrated Drive Electronics (IDE), Firewire, Universal Flash Storage (UFS), WiFi, Bluetooth, and/or nonvolatile memory express (NVMe).

The auxiliary power supply 3230 may be coupled to the host 3100 through the power connector 3002. The auxiliary power supply 3230 may be charged with power supplied from the host 3100. The auxiliary power supply 3230 may supply power of the SSD 3200 when power is not smoothly supplied from the host 3100. For example, the auxiliary power supply 3230 may be disposed within or external to the SSD 3200. For example, the auxiliary power supply 3230 may be disposed on a main board and may supply auxiliary power to the SSD 3200.

The buffer memory 3240 may function as buffer memory of the SSD 3200. For example, the buffer memory 3240 may temporarily store data received from the host 3100 or data received from the plurality of flash memory 3221 to 322$n$, or may temporarily store metadata (for example, mapping tables) of the flash memory 3221 to 322$n$. The buffer memory 3240 may include volatile memory such as DRAM, SDRAM, DDR SDRAM, LPDDR SDRAM, or GRAM or nonvolatile memory such as FRAM, ReRAM, STT-MRAM, or PRAM.

According to an embodiment, the host 3100 may operate in the same manner as the host 300 described with reference to FIG. 5 or FIG. 10.

Figure 22:
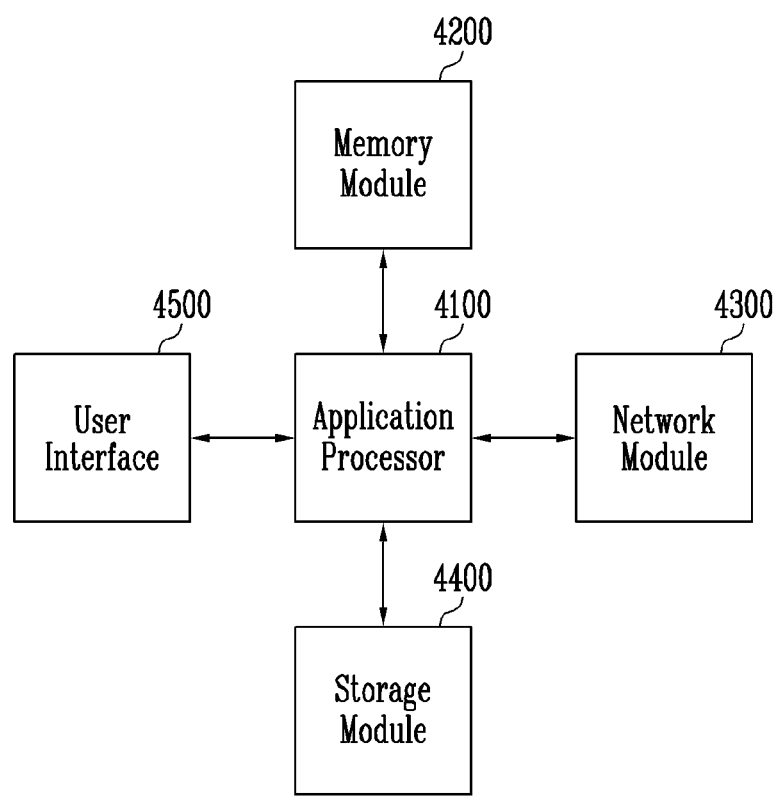
FIG. 22 is a block diagram illustrating a user system to which a storage device is applied according to an embodiment of the present disclosure.

FIG. 22 is a block diagram illustrating a user system 4000 to which a storage device is applied according to an embodiment of the present disclosure.

Referring to FIG. 22, the user system 4000 may include an application processor 4100, a memory module 4200, a network module 4300, a storage module 4400, and a user interface 4500.

The application processor 4100 may operate components included in the user system 4000, an Operating System (OS), or a user program. For example, the application processor 4100 may include controllers, interfaces, graphic engines, and the like, for controlling the components included in the user system 4000. The application processor 4100 may be provided as a System-on-Chip (SoC).

The memory module 4200 may function as main memory, operational memory, buffer memory, or cache memory of the user system 4000. The memory module 4200 may include volatile random access memory such as DRAM, SDRAM, DDR SDRAM, DDR2 SDRAM, DDR3 SDRAM, LPDDR SDRAM, LPDDR2 SDRAM, and LPDDR3 SDRAM or nonvolatile random access memory such as PRAM, ReRAM, MRAM, and FRAM. For example, the application processor 4100 and the memory module 4200 may be packaged based on Package-on-Package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or Wi-Fi. For example, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. According to an embodiment, the storage module 4400 may be implemented as a nonvolatile semiconductor memory device, such as Phase-change RAM (PRAM), Magnetic RAM (MRAM), Resistive RAM (RRAM), NAND flash memory, NOR flash memory, or NAND flash memory having a three-dimensional (3D) structure. For example, the storage module 4400 may be provided as a removable storage medium (i.e., removable drive), such as a memory card or an external drive of the user system 4000.

According to an embodiment, the storage module 4400 may include a plurality of nonvolatile memory devices, and the plurality of nonvolatile memory devices may operate in the same manner as the memory device as described above with reference to FIG. 1. The storage module 4400 may operate in the same manner as the storage device 50 described above with reference to FIG. 1.

The user interface 4500 may include interfaces which input data or commands to the application processor 4100 or output data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, or a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, or a monitor.

According to embodiments of the present disclosure, a computing system having improved security read performance and an operating method of the computing system are provided.

While the present invention has been illustrated and described in connection with various embodiments, those skilled in the art will understand in light of this disclosure that various changes in form and operation may be made without departing from the spirit and scope of the present invention. The present invention encompasses all such changes that fall within the scope of the claims.

What is claimed is:

1. A storage device comprising:
a memory device including Replay Protected Memory Block (RPMB) regions; and
a memory controller configured to:
read target data from the RPMB regions in response to a first security read request including a first RPMB message and received from a host;
provide the target data to the host as a first response corresponding to the first security read request;
generate a device authentication code based on a key shared with the host and the target data while providing the target data to the host; and
provide a second response including a second RPMB message, which includes the device authentication code, to the host in response to a second security read request received from the host,
wherein each of the first RPMB message and the second RPMB message includes at least one of fields of stuff bytes, Message Authentication Code (MAC), data, nonce, write counter, address, block count, result and message type.

2. The storage device of claim 1,
wherein a field of the stuff bytes includes padding data or dummy data.

3. The storage device of claim 1,
wherein a field of the MAC includes an authentication code calculated using a hash-based message authentication code algorithm, and
wherein a field of the MAC in the second RPMB message includes the device authentication code.

4. The storage device of claim 1,
wherein a field of the data includes data to be written in the RPMB regions or data to be read from the RPMB regions, and
wherein a field of the data in the second RPMB message includes the target data.

5. The storage device of claim 1,
wherein a field of the nonce includes a random number generated by the host or a copy of the random number received from the host,
wherein a field of the nonce in the first RPMB message includes the random number generated by the host, and
wherein a field of the nonce in the second RPMB message includes a copy of the field of the nonce in the first RPMB message.

6. The storage device of claim 1,
wherein a field of the write counter includes a number of times a write operation is successfully performed on the RPMB regions.

7. The storage device of claim 1,
wherein a field of the address includes a logical address of data to be programmed to or read from the RPMB regions, and
wherein a field of the address in the first RPMB message includes a logical address of the target data.

8. The storage device of claim 1,
wherein a field of the block count includes a number of logical blocks for which an RPMB write operation or an RPMB read operation is requested in units of 256 bytes.

9. The storage device of claim 1,
wherein a field of the message type includes an indicator that indicates one of a request message type and a response message type and one of a read operation and a write operation.

10. The storage device of claim 1,
wherein the memory controller performs the security read operation on the RPMB regions, in response to the first security read request and the second security read request, and
wherein the security read operation includes a step for an authentication read request to read the target data and a step for an authentication read response to provide the device authentication code to the host.

11. The storage device of claim 10,
wherein the host provides a command protocol unit including the first RPMB message to the memory controller as the first security read request in the step for the authentication read request.

12. The storage device of claim 10,
wherein the memory controller provides the target data and a response protocol unit as the first response to the host in the step for the authentication read request.

13. The storage device of claim 10,
wherein the host provides a command protocol unit to request the device authentication code to the memory controller as the second security read request in the step for the authentication read response.

14. The storage device of claim 10,
wherein the memory controller provides a response protocol unit including the second RPMB message as the second response in the step for the authentication read response.

15. The storage device of claim 1,
wherein the memory controller configured to perform a security write operation on the RPMB regions, in response to security write requests received from the host,
wherein the security write operation includes a step for an authentication write request to store write data in the RPMB regions, a step for a result read request and a step for a result read response, and
wherein the host generates a host authentication code while providing the write data to the memory controller.

16. The storage device of claim 15,
wherein the host provides the write data and a first request of the security write requests, which instructs the memory controller to store the write data, to the memory controller in the step for the authentication write request, and
wherein the memory controller generates a write device authentication code using a key shared with the host and the write data received from the host in the step for the authentication write request.

17. The storage device of claim 15,
wherein the host provides the host authentication code and a second request of the security write requests, which checks whether a result value of the security write operation is ready to be collected, to the memory controller in the step for the result read request, and wherein the memory controller controls the memory device to store the write data in the RPMB regions when the host authentication code is identical to the write device authentication code.

18. The storage device of claim 15,
wherein the host provides a third request of the security write requests, which requests the result value of the security write operation, and
wherein the memory controller provides the result value to the host in the step for the result read response.

* * * * *